(12) United States Patent
Ewald

(10) Patent No.: US 12,412,341 B2
(45) Date of Patent: Sep. 9, 2025

(54) MARCHING LATTICE

(71) Applicant: Autodesk, Inc., San Francisco, CA (US)

(72) Inventor: Brent Charles Ewald, South Lyon, MI (US)

(73) Assignee: AUTODESK, INC., San Francisco, CA (US)

( * ) Notice: Subject to any disclaimer, the term of this patent is extended or adjusted under 35 U.S.C. 154(b) by 176 days.

(21) Appl. No.: 18/470,339

(22) Filed: Sep. 19, 2023

(65) Prior Publication Data

US 2025/0095295 A1 Mar. 20, 2025

(51) Int. Cl.
*G06T 17/20* (2006.01)
(52) U.S. Cl.
CPC .......... *G06T 17/20* (2013.01); *G06T 2210/52* (2013.01)
(58) Field of Classification Search
USPC .................................................. 345/419–427
See application file for complete search history.

(56) References Cited

U.S. PATENT DOCUMENTS 11,983,815 B2 * 5/2024 Shen ....................... G06T 17/20

OTHER PUBLICATIONS

Sahillioğglu, Yusu F, "A marching algorithm for isosurface extraction from face-centered cubic lattices," 2017, Turkish Journal of Electrical Engineering and Computer Sciences: Vol. 25: No. 3, Article 71. https://doi.org/10.3906/elk-1604-328 (Year: 2017).*
"Marching squares", Wikipedia, https://en.wikipedia.org/w/index.php?title=Marching_squares&oldid=1166889967, pp. 1-7, as downloaded Sep. 7, 2023.
Treece, G.M., et al., "Regularised marching tetrahedra: improved iso-surface extraction", Cambridge University Engineering Department, Sep. 1998, pp. 1-27.

* cited by examiner

*Primary Examiner* — Michael J Cobb
(74) *Attorney, Agent, or Firm* — Gates & Cooper LLP

(57) ABSTRACT

A method and system provide for extracting an isosurface. A set of three-dimensional (3D) asymmetric sampling grids are created based on a sampling resolution and a region of interest. The set of grids cover a 3D scalar field and are tiles made up of tetrahedrons. The 3D scalar field is evaluated based on the set of 3D asymmetric sampling grids to generate a value for each tile, convert the values to cells, and assign an index to each cell. For each cell, the index is utilized to identify, in a lookup table, an enumerated tetrahedron. For each identified enumerated tetrahedron that contains an isosurface crossing, an isosurface connection is estimated between new points of edges of the identified tetrahedron. A mesh is created to connect the new points and utilized as the extracted isosurface.

20 Claims, 16 Drawing Sheets

PF=.78

PF= 0.9069

MARCHING LATTICE

BACKGROUND OF THE INVENTION

1. Field of the Invention

The present invention relates generally to computer-aided design (CAD), computer-aided manufacturing (CAM), computer-aided engineering (CAE), printed circuit board design, and three-dimensional (3D) modeling applications, and in particular, to a method, system, apparatus, and article of manufacture for extracting iso-surfaces from 3D volumes.

2. Description of the Related Art

In computer software, and in particular in the field of CAD based modeling, applications often need to model a part that can be manufacturing. To model such a part, the surfaces of a part need to be extracted.

Marching cubes and marching squares are the current industry standard at extracting iso-surfaces from a given 3D volume. However, as resolution increases or the size of the volume grows, prior art systems it suffer from the curse of dimensionality. i.e., the amount of measurements you have to take is cubic with the length of the object for marching cubes and square with marching squares. This can become expensive and tedious to evaluate large volumes. To better understand these problems, a more detailed description of marching squares may be useful.

Marching Squares

Marching Squares is a commonly used algorithm in computer graphics for generating contour lines or isolines from a two-dimensional scalar field (rectangular array of individual numerical values). As used herein, a scalar field is a function associating a single number to every point in a space, where the scalar is a number. A similar approach may be used to contour 2D triangle meshes. The algorithm operates by examining each grid cell in the scalar field and determining which of sixteen (16) possible configurations it falls under based on the values of the scalar field at its four corners. Each configuration corresponds to a particular set of contour lines, which can be approximated using linear interpolation between the corners of the grid cell. By applying this algorithm iteratively to each grid cell, a smooth contour line can be generated that accurately represents the shape of the scalar field.

FIG. 1 illustrates the basic algorithm for marching squares of the prior art. The method first applies 104 a threshold to a 2D (two dimensional) field 102 to make a binary image 106 (containing 1 where the data is above the isovalue or 0 where the data value is below the isovalue). Every 2×2 block of pixels in the binary image forms a contouring cell, so the whole image is represented by a grid 108 of such cells. Next, for each cell in the contouring grid: (1) compose 110 the 4 bits at the corners of the cell to build a binary index 112. The resulting 4-bit index can have 16 possible values in the range 0-15; (2) use the cell index to access/lookup 114 a pre-built lookup table 116 with 16 entries listing the edges needed to represent the cell (with the resulting grid and edges illustrated at 118; and (3) apply 120 linear interpolation between the original field data values to find the exact position of the contour line along the edges of the cell. As the contour may be ambiguous at saddle points, the ambiguity may be resolved by using the average data value for the center of the cell to choose between different connections of the interpolated points.

Uniform Sphere Packing

As marching squares/cubes is based on fitting squares/cubes into a defined area/grid cell, another option may attempt to fit/pack spheres into such an area/grid. Uniform Sphere Packing is the problem of arranging identical spheres in space such that no two spheres overlap and the packing density is as high as possible. This problem has attracted significant attention from mathematicians, physicists, and engineers due to its wide range of applications in fields such as material science, crystallography, and information theory.

In two-dimensional (2D) space, the maximum packing density achievable by circular disks is known to be $\pi\sqrt{3}/6 \approx 0.9069$, which was first proved by Joseph Louis Lagrange in 1773. This configuration, known as the hexagonal packing arrangement, in which the centers of all neighboring circles form a regular hexagon surrounding any given point.

In three-dimensional (3D) space, the maximum packing density achievable by identical spheres is known to be approximately 0.74 and was proved by Cark Friedrich Gauss in 1831. The common packing configurations that maximize the packing density are face-centered cubic lattice and the hexagonal close packing lattice. Other common packing configurations in 3D space include the body-centered cubic lattice and the simple cubic lattice each with packing densities of approximately 0.68 and 0.52 respectively. When embodiments of the invention consider marching cubes, it uses a simple cubic lattice.

Increasing Resolution and Dimensionality Challenge

As the resolution and dimensionality of the scalar field increases, the challenge with marching squares becomes twofold. First, increasing resolution means that there are more grid cells to process, which can lead to significant computational overhead. This can make the algorithm impractical to use in real-time applications or on large datasets. Second, as the dimensionality of the scalar field increases beyond two dimensions, the number of possible configurations that each grid cell can fall under increases dramatically. This can lead to a combinatorial explosion in the number of possible contour line configurations, making it difficult to generate accurate and efficient isolines. To address these challenges, researchers have developed a variety of techniques such as adaptive sampling, parallel processing, and higher-dimensional marching algorithms to improve the performance and accuracy of marching squares in high-resolution and high-dimensional scalar fields.

In view of the above, in 3D, one needs to extract the surface of a volume. Users pick a resolution and a grid representing the volume (at that resolution) is sampled. The different options are then enumerated and the contours are drawn. Unfortunately, such a technique requires extensive point sampling resulting in excessive computational time where equations may need to be solved at each point. Further, with many images such as in medical imaging, the images and points are moving. As such, the sampling must be conducted within certain time windows further increasing the sampling cost. Another problem with the prior art approach (as described above) is that of ambiguity in what the resulting contour should look like. For example, at saddle points, it is unknown where the diagonal lines representing the contour should be drawn. Prior art systems may attempt to resolve such an ambiguity by averaging all four points (of a 2D square) to determine the center of the cell to choose where to draw the contour line or sample another point at the center when such ambiguities arise.

In view of the above, what is needed is a mechanism for extracting the isosurfaces that is accurate and computationally efficient for large volumes as the dimensionality and size of the volume increases.

SUMMARY OF THE INVENTION

To overcome the problems of the prior art, embodiments of the invention change the reference frame of the evaluation from simple cubic grid sampling to a lattice based sampling including that of Hexagonal Close Packed (HCP) (and/or other type of lattice structure). Further, embodiments of the invention evaluate tetrahedrons rather than squares resulting in better contours at lower resolution.

In view of the above, it may be noted that HCP is about 41% more sample dense than a cubic grid. This increased sampling can by offset by lengthening the edge until there is an equivalent "inSphere," which is the maximum sphere that can fit within the volume. Equivalent "inSphere" is one metric that can be used to determine the equivalent edge length among many others such as "outSphere" or the average distance to a sample within the domain. Using this method, the sampling in 3D space can be reduced by 75% and result in the same (or better) quality output. This outcome is dependent on the "Smoothness" of the field being evaluated.

BRIEF DESCRIPTION OF THE DRAWINGS

Referring now to the drawings in which like reference numbers represent corresponding parts throughout:

FIG. 7A illustrates a standard triangle while

DETAILED DESCRIPTION OF THE INVENTION

Figure 1:
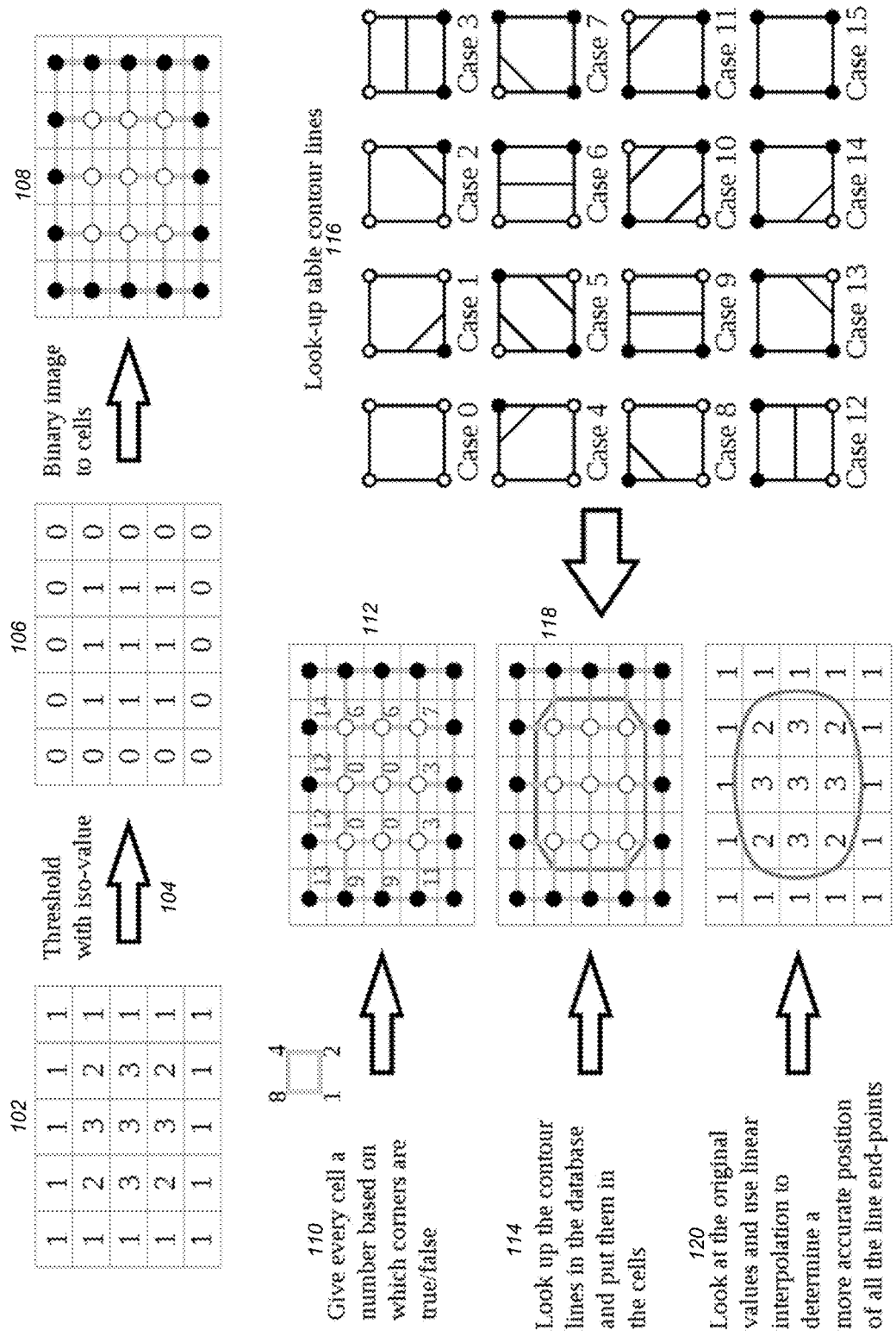
FIG. 1 illustrates the basic algorithm for marching squares of the prior art.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention extract isosurfaces from three-dimensional scalar fields and provide an alternative to the traditional Marching Cubes algorithm. Embodiments of the invention overcome some of the limitations of Marching Cubes, such as topological ambiguity and the presence of degenerate cases, while maintaining the ability to accurately represent the underlying scalar field. The effectiveness of the approach may be demonstrated through several examples and compared to results obtained using Marching Cubes.

Lattice Sampling and Properties

IsoSurface and IsoContour Quality Measurement

Once a potential isosurface is generated, a method is needed to compare the quality of the resultant mesh. There are many such methods and a brief summary is described herein. It should be noted that many of these metrics require some knowledge of the ground truth. Here it is useful to provide functions that have a known SDF (signed distance function) rather than an arbitrary field.

Surface area: This metric measures the total surface area of the isosurface, which is directly related to the accuracy of the representation of the original dataset. The assumption here is that all areas that are captured are real. This can be evaluated on an arbitrary field.

Area-weighted distance error: This metric measures the distance between the isosurface and the true surface of the SDF, but it is weighted by the area of the triangles formed by the isosurface. This takes into account the fact that errors in larger triangles have a greater impact on the overall accuracy of the isosurface. A smaller area-weighted distance error indicates a more accurate representation of the underlying field.

Normal deviation: This metric measures the difference between the surface normal of the isosurface and the original dataset. A smaller normal deviation indicates a more accurate representation of the original dataset. This is difficult, if not impossible to know fully in most applications unless it is assumed that the surface any given point on the isosurface is referencing should have the normal of the nearest point on the underlying field.

Geometric continuity: This metric measures the smoothness of the isosurface. A higher degree of geometric continuity indicates a smoother and more visually appealing isosurface. The applicability of the metric is dependent on the underlying field.

Feature preservation: This metric measures the ability of the isosurface to preserve important features of the original data, such as edges or corners. The applicability of the metric is dependent on the underlying field.

The area-weighted distance error metric is an important improvement over the traditional distance error metric, as it takes into account the varying importance of different parts of the isosurface. This can lead to more accurate and meaningful evaluations of isosurface quality.

Due to the dependence of the underlying field being evaluated, embodiment of the invention may restrict the analysis to Area-weighted distance error and surface area.

Properties of Square Sampling

If one were to parameterize the sampling grid in terms of the edge length, l, the properties of this sampling pattern may be expressed in terms of l. Some of the properties of such a strategy would be: Side Length—l, Area—A, Number of Sampling Points over a semi-infinite plane, N, Diameter of maximum inscribed circle—$d_m$. The diameter of the maximum inscribed circle is a good proxy for detectable feature size. These values can be expressed as follows:

$$\text{Side Length: } l = \text{given}$$

$$\text{Sample Domain: } S = [S_x, S_y]$$

$$\text{Area: } A_u = l^2$$

$$\text{Maximum Inscribed Circle Diameter: } d_m = l \cdot \sqrt{2}$$

$$\text{Number of Samples finite: } N_f = ((S_x/l) + 1) * ((S_y/l) + 1)$$

$$\text{Number of Samples semi-infinite: } N_i = (S_x * S_y)/l^2$$

Hexagonal Sampling

Marching Squares uses a uniform sampling grid to evaluate the field and identify contours. If one were to think of the sampling pattern as a lattice structure, it would be pmm2, or put simply a regular square lattice. However, there is no reason the sampling should be constrained to a simple rectangular grid, though it is the simplest to track.

Figure 2:
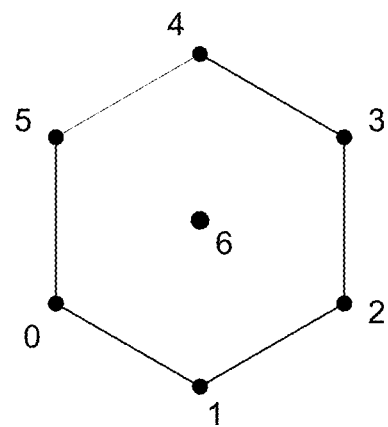
FIG. 2 illustrates a layout of a sampling grid in two dimensions (2D) in accordance with one or more embodiments of the invention.
Figure 3:
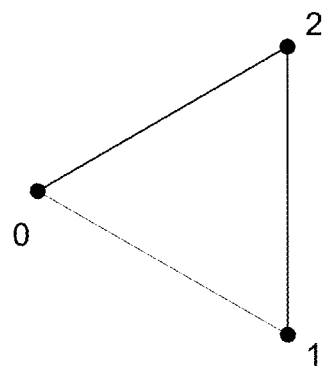
FIG. 3 illustrates a subdivision of the sampled hexagon of FIG. 2 into triangles in accordance with one or more embodiments of the invention.

If one envisions the field as an object and the sampling as a lattice, any number of possible sampling patterns can be implemented. If one assumes that the surface (that is being extracted) is either uniform or randomly distributed, then one can also assume the use of uniform sphere packing as the control for spacing. The densest lattice for uniform spheres (2D) is Hexagonal Lattice. Using a Hexagonal Lattice as a reference point, embodiments of the invention can create a sampling grid in 2D with the layout illustrated in FIG. 2:

Using this sampling grid, one can further sub-divide the sampled hexagon into triangles as illustrated in FIG. 3 that have the following properties:

$$\text{Side Length: } l = \text{given}$$

$$\text{Sample Domain: } S = [S_x, S_y]$$

$$\text{Area: } A_u = l^2 * \sqrt{3}/4$$

$$\text{Maximum Inscribed Circle Diameter: } d_m = l \cdot 2 \cdot \sqrt{3}/3$$

$$\text{Number of Samples finite: } N_f = 2 * [S_x/(\sqrt{3} * l) + 1] * [S_y/l + 1]$$

$$\text{Number of Samples semi-infinite: } N_i = 2 * (S_x * S_y)/(l^2 * \sqrt{3})$$

Comparing Square and Hex

Embodiments of the invention can compare the relative values of these two different sampling patterns. The following table shows the relevant values. Note: the edge length of the square has been changed to a from 1 to remove ambiguity:

TABLE 1

Comparison of Lattice Properties

| Lattice | Edge | Unit Area | Max Circle | Samples |
|---------|------|-----------|------------|---------|
| Square  | a    | $a^2$     | $a \cdot \sqrt{2}$ | $(S_x * S_y)/a^2$ |
| Hex     | 1    | $l^2 * \sqrt{3}/4$ | $1 \cdot 2 \cdot \sqrt{3}/3$ | $2 * (S_x * S_y)/(l^2 * \sqrt{3})$ |

If one assumes the same edge length and like terms are canceled, one can arrive at the following result:

TABLE 2

Comparison of Lattice Properties Normalized

| Lattice | Edge | Unit Area | Max Circle | Samples |
|---------|------|-----------|------------|---------|
| Hex/Square | 1 | $\sqrt{3}/4$ | $(2 \cdot \sqrt{3})/(3 \cdot \sqrt{2})$ | $2/\sqrt{3}$ |
| Hex/Square-Decimal | 1 | .433 | 0.817 | 1.155 |

One way to interpret this would be that an increase in sampling of 15 percent can reduce the maximum undetected feature length by 18 percent. Obviously, this is dependent on fields, and one could simply scale up the Hex edge length to get the same number of sample points but still reap the benefit of resolving smaller features. Using this framework, one can reverse the problem to provide the same max circle diameter and decrease sampling. This would result in the edge length of the hexagonal lattice being 1.224·1 while using only 77 percent of the samples.

Logical Flow

Figure 4:
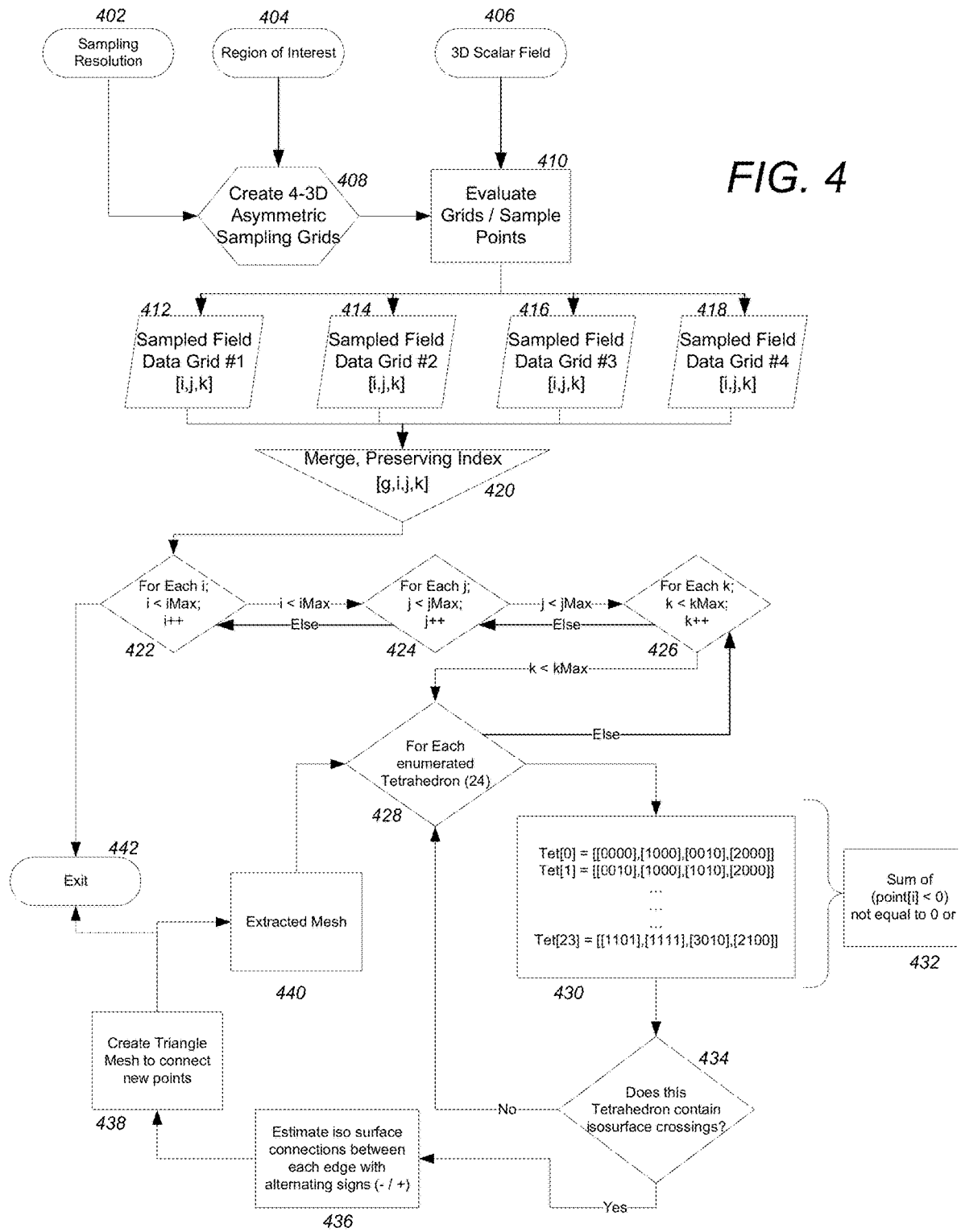
FIG. 4 illustrates an exemplary logical flow for generating/extracting a surface in accordance with one or more embodiments of the invention.

While the above describes exemplary mechanisms that can be used to evaluate a generated/extracted surface, FIG. 4 illustrates an exemplary logical flow for generating/extracting a surface in accordance with one or more embodiments of the invention. One of the major differences between embodiments of the invention and marching cubes is that for marching cubes, one doesn't require an enumeration, however this list is small (24) and can be done completely in parallel so it isn't any additional overhead.

The process begins with obtaining the inputs comprising the sampling resolution 402, the region of interest 404, and the 3D scalar field 406. Such inputs 402-406 may be input by the user and/or automatically determined/selected (e.g., via default settings or an automatic selection). The sampling resolution 402 and region of interest 404 are used to a set of 3D asymmetric sampling grids at 408 (i.e., the set of 3D asymmetric sampling grids are based on the sampling resolution and region of interest). In one or more embodiments, the resolution depend on the printer, field, etc. for which the resulting extracted isosurface is utilized. For example, the resolution may be measured/based on dots per inch (as printers utilize such a measurement). The region of interest depends on the application. In CAD modeling it is often a "bounding box" that contains the part. In medical imaging it could be a sphere of radius R around the heart, etc., In this regard, the region of interest can simply be some bounds to the evaluation problem.

In addition, the set of 3D asymmetric sampling grids cover the 3D scalar field 406 and consist of/comprise one or more tiles. Further, as described further below, in one or more embodiments, the set of 3D asymmetric sampling grids comprises four (4) sampled field data grids 412-418 that are merged at 420 (while preserving the indices). In addition, all vertices that form the one or more tiles may be bounded within the set of 3D asymmetric sampling grids and the indices. In such embodiments, the cells are positively indexed.

The 3D scalar field 406 is evaluated at 410 based on the set of 3D asymmetric sampling grids. This evaluation 410 generates/produces sampled field data grids #1 412, #2 414, #3 416, and #4 418. In this regard, the evaluating generates a binary value for each of the one or more tiles, converts the binary values to cells, and assigns an index to each cell. It may be noted that a binary value will only allow one to extract an isosurface to the mid-point. Thu, in one or more embodiments, float or double values may be used for more precision in estimating the surface crossing. The sampled field data grids 412-418 are merged while preserving the indices for the grids [g,i,j,k] at 420.

Figure 5A:
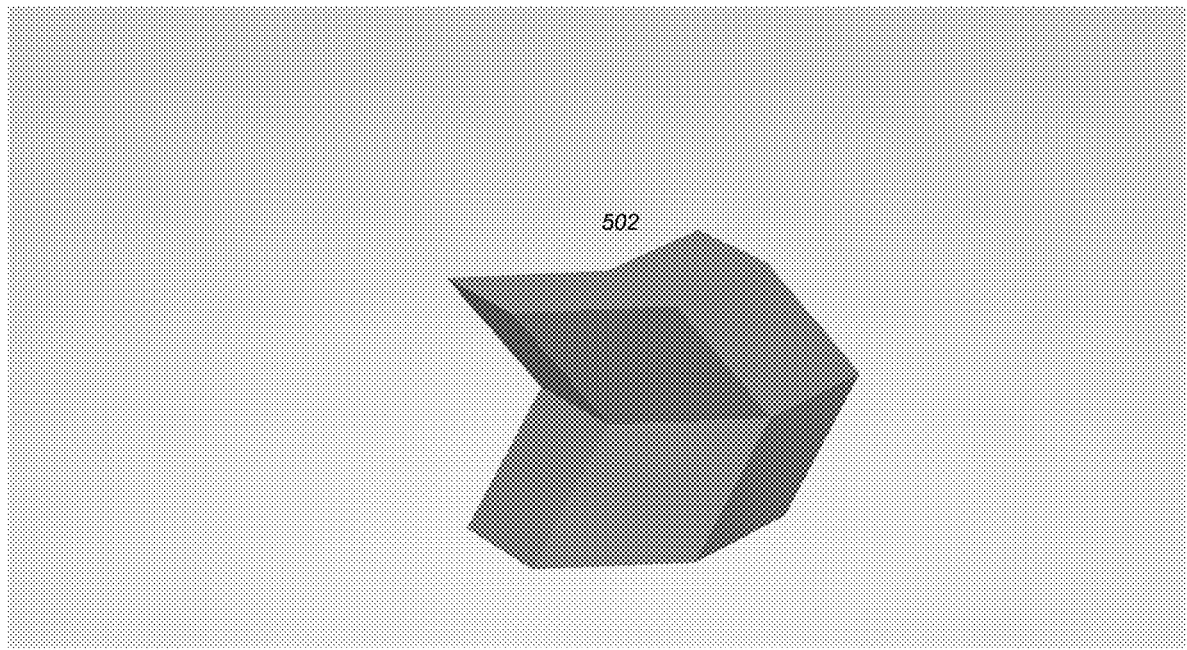
FIGS. 5A and 5B illustrate exemplary visual representations of the shapes/tiles that may be used to file and fill a volume in accordance with one or more embodiments of the invention.
Figure 5B:
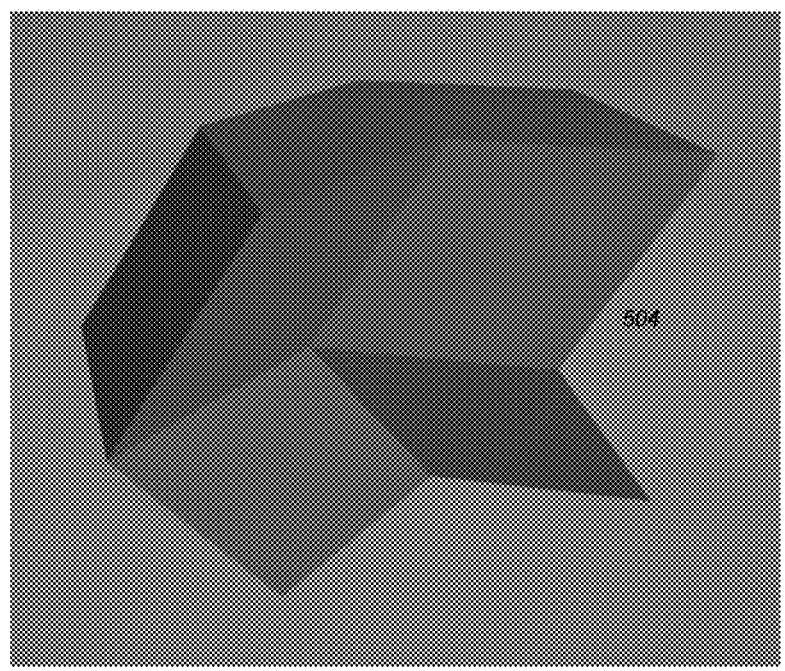

The one or more tiles may comprise hexagonal close pack (HCP) tetrahedrons. FIGS. 5A and 5B illustrate exemplary visual representations of the shapes/tiles that may be used to file and fill a volume in accordance with one or more embodiments of the invention. It may be noted that shapes 502 and 504 are just examples of all the possible tetrahedron combinations that could be used. Other tetrahedrons are components that, when combined, create a tile. This tile is essentially a replacement for a voxel component that is created by a traditional sampling pattern.

In one or more embodiments, a solid may be constructed out of the set of 3D asymmetric sampling grids. The solid may have one or more of the following properties:
  is space filing or tileable;
  is non-self intersecting; and
  has a consistent winding direction.
Optionally, the solid may also use all vertices of the scalar field.

Further to the above, in one or more embodiments, the index may be based on four (4) dimensions. Further, a stride between sampled points in the one or more tiles may vary by dimension. In addition, each index may be connected out of two or more simplex shapes.

The tile is then iterated over via looping over the three (3) (or 4) dimensions. Referring again to FIG. 4, the looping over the dimensions is depicted at 422-426. Essentially, the looping provides:

```
for each i in x (loop 422):
    for j in y (loop 424):
        for k in z (loop 426):
            Do something (428) to each tile or each tet within the tile.
```

In this regard, for each cell, the cell's index is utilized to identify, in a lookup table 430, an enumerated tetrahedron. In other words, while looping through each dimension, an operation is conducted for each enumerated tetrahedron at 428. In one or more embodiments, the lookup table 430 comprises twenty-four (24) enumerated tetrahedrons; and the identifying of the enumerated tetrahedron is done in parallel (e.g., via a graphics processing unit [GPU] or other parallel processing system) for each enumerated tetrahedron in the lookup table 430. In view of the above, the identifying of the enumerated tetrahedron and estimating are iteratively performed over three or more dimensions.

For each identified enumerated tetrahedron that contains an isosurface crossing (i.e., determined at step 434), an isosurface connection between new points of an edge of the identified enumerated tetrahedron is estimated (i.e., at step 436). For example, lookup table 430 (which may be an array) may be generated where each enumerated tetrahedron consists of the sum 432 of the points (for all points in the tetrahedron) less than zero where the sum is not equal to 0 or 4.

Figure 6:
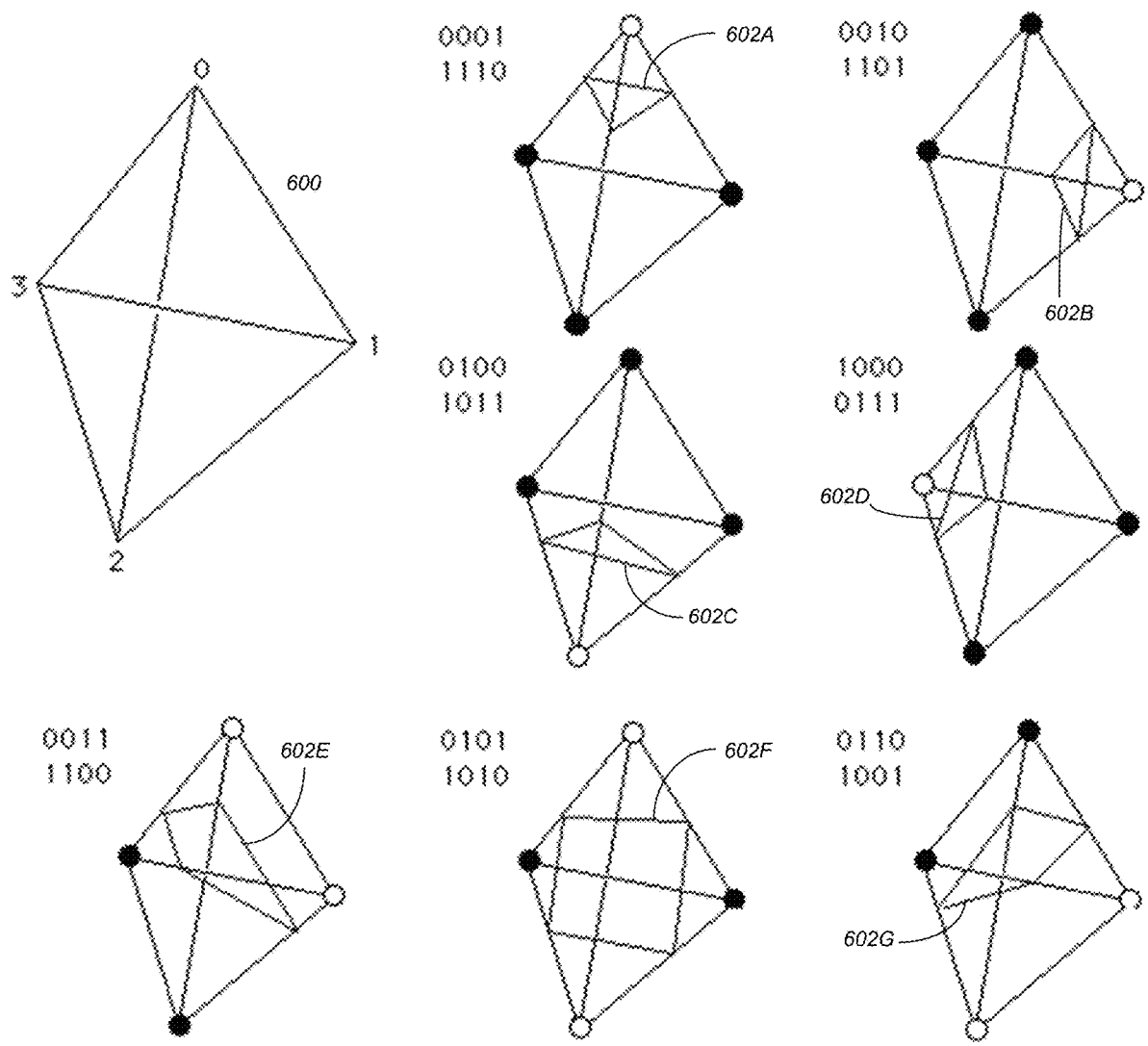
FIG. 6 illustrates exemplary isosurface crossings in accordance with one or
more embodiments of the invention.

In view of the above, a determination is made at 434 regarding whether the enumerated tetrahedron contains isosurface crossings. FIG. 6 illustrates exemplary isosurface crossings 602A-602G that are considered/evaluated for each tetrahedron 600 in step 434. Once all isosurface crossings have been identified, the process continues at step 436 where isosurface connections between each edge are estimated with alternating signs (−/+). A triangle mesh is then created to connect the new points at step 438 and the mesh is extracted at step 440. The process is complete at step 442 (i.e., once all dimensions have been looped through) where the mesh is utilized as the extracted surface. Such a use may further include manufacturing (e.g., via 3D printing or otherwise) an object based on the extracted isosurfaces, generating/displaying/interacting with an image (e.g., a medical image, topographic map, isobars for weathermaps, etc.) based on the extracted isosurface.

Implementation and Examination Criteria
Implementation Details

Prior solutions include that of marching cubes and marching tetrahedrons. More generally, the problem embodiments of the invention are solving is efficiently sampling any domain. The pros/advantages for utilizing embodiments of the invention include:
  Equal sampling coverage with significantly fewer sampling points (~33% reduction in 2D sampling problems and ~75% reduction in 3D sampling problems);
  Formulation of hexagonal close packed lattice configuration as four (4) 3D asymmetric grids, enabling all of the traditional parallel processing algorithms to be employed.
Cons of utilizing embodiments of the invention may include:
  With isosurface extraction, the sampling strategy can create significantly more triangles/line segments compared to that of the cube/square methods
  In systems that involve significant post-processing, this can offset gains from a reduced field evaluation.

Figure 7A:
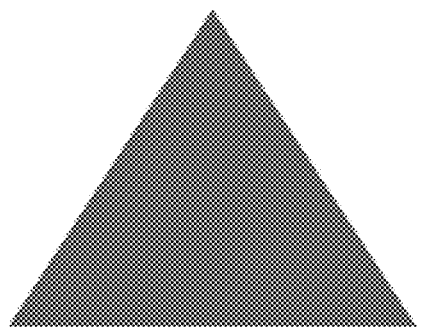
Figure 7B:
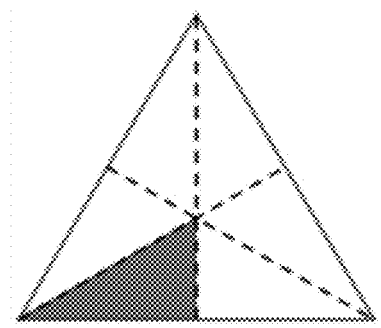
FIG. 7B illustrates the reduction through symmetry in accordance with one or more embodiments of the invention.
Figure 7C:
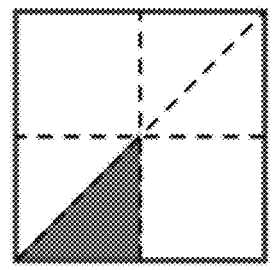
FIG. 7C illustrates a reduction of a square through symmetry in accordance with one or more embodiments of the invention.

One way to evaluate how much additional information is collected with a sampling strategy (and triangle v. square evaluation) is by integrating the distance of a differential element within the field form the nearest sampled point. Through symmetry, this can be reduced. FIG. 7A illustrates a standard triangle while FIG. 7B illustrates the reduction (i.e., by six (6) times) through symmetry (dividing the triangle into 6 symmetric triangles) in accordance with one or more embodiments of the invention. The integration of the differential element is:

$$6\int_0^{\pi/6}\int_0^{l/2\cos(\phi)} r^n r dr\, d\phi$$

Where n is an empirical parameter that reflects the 'smoothness' of the field being evaluated. Similarly, through symmetry, the square (illustrated in FIG. 7C) can be reduced to eight (8) times using the following double integration:

$$8\int_0^{\pi/4}\int_0^{l/2\cos(\phi)} r^n r dr\, d\phi$$

The larger the result of this integral, the lower the sampling coverage.

Expanding on the 3D Solution:

The fact that each sample contains more information per sample (when compared to the traditional marching cubes sampling pattern) is one advantage of embodiments of the invention. However, to improve usefulness, some embodiments may utilize a coordinate system that has additional properties to exploit it. For example, a 4-grid representation may be utilized. In order to represent the field using HCP Tets, embodiments of the invention may introduce a, very thin, $4^{th}$ dimension which has addresses of 0, 1, 2, or 3 (assuming index 0). Additionally the 'stride' or spacing between the sample points varies by dimension with:

$$\left[x = l\sqrt{3},\, y = l,\, \text{and}\, z = l\sqrt{\frac{2}{3}}\right]$$

It should be noted that any combination of strides are possible if one reorients the coordinate system within the field. For example, an equivalent system could have the strides be:

$$\left[x = l,\, y = l\sqrt{3},\, \text{and}\, z = l\sqrt{\frac{2}{3}}\right]$$

In addition to the strides, each grid has offsets relative to the minimum point of the field. The offsets currently used (in embodiments of the invention) are shown below but any constant could be applied to those offsets to have an equivalent system:

Given strides:

| $\left[x = l\sqrt{3},\, y = l,\, \text{and}\, z = l\sqrt{\frac{2}{3}}\right]$ | | | |
|---|---|---|---|
| Grid 0 | Grid 1 | Grid 2 | Grid 3 |
| $\left[\frac{l}{4}, -\frac{l}{4}, -\frac{l}{4}\right]$ | $\left[-\frac{l}{4}, \frac{l}{4}, -\frac{l}{4}\right]$ | $\left[\frac{l}{12}, \frac{l}{4}, \frac{l}{4}\right]$ | $\left[\frac{7l}{12}, -\frac{l}{4}, \frac{l}{4}\right]$ |

The size of the grid to be sampled can be determined by simple division of the field size by the stride in any given dimension.

After sampling, one needs to construct solids out of the sample points within the field that has the following four properties:

1. Space filling/tileable
2. Non-self intersecting
3. Consistent winding direction
4. Uses all the vertices in the field If the connectivity map has all of these properties, it can successfully generate an isosurface for the field. The fourth one is an optional requirement but should be enforced to have the highest accuracy surface.

Figure 8:
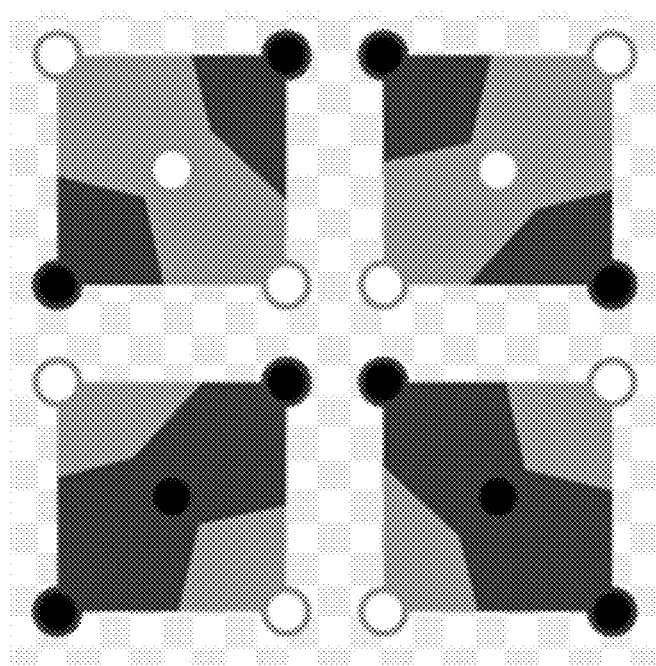
FIG. 8 illustrates four (4) exemplary cells where connectivity is determined out of several simplex shapes in accordance with one or more embodiments of the invention.

In order to avoid ambiguity of indeterminate conditions, conditions where the connectivity is clearly determined without further sampling or assumptions, (see FIG. 8), embodiments of the invention have chosen to connect each i, j, k index out of several simplex shapes (tetrahedrons in 3D). Simplex shapes do not have this property of ambiguity. In this regard, FIG. 8 illustrates four (4) exemplary cells where connectivity is clearly determined out of several simplex shapes in accordance with one or more embodiments of the invention.

In order to construct non-self intersecting tetrahedrons with the most uniform shape, each i, j, k index in the field is associated with 24 tetrahedrons. These tetrahedrons can be organized into tileable shapes in many ways. As described above, FIG. 5A-5B illustrate exemplary configurations. These exemplary configurations have some convenient properties:

All the vertices that form the shapes 502-504 are bounded within the four grids and the Indices [I–I+1, J–J+1, K–K+1] which makes it simple to execute the algorithm through a given domain because everything is positively indexed.

The indices (given the stride, and grids above) can be written in [g, i, j, k] where g is the grid, and i, j, and k are the i, j, and k coordinates relative to the current index being evaluated.

The following provides exemplary code that stores the twenty-four (24) tetrahedrons, each constructed of four (4) vertices:

```
std::array<Index4, 4>({Index4(0, 0, 0, 0), Index4(1, 0, 0, 0), Index4(0, 0, 1, 0), Index4(2, 0, 0, 0)}),
std::array<Index4, 4>({Index4(0, 0, 1, 0), Index4(1, 0, 0, 0), Index4(1, 0, 1, 0), Index4(2, 0, 0, 0)}),
std::array<Index4, 4>({Index4(1, 1, 0, 0), Index4(0, 0, 0, 0), Index4(0, 0, 1, 0), Index4(2, 0, 0, 0)}),
std::array<Index4, 4>({Index4(1, 0, 1, 0), Index4(0, 0, 1, 0), Index4(2, 0, 0, 0), Index4(2, 0, 1, 0)}),
```

```
std::array<Index4, 4>({Index4(0, 0, 1, 0), Index4(3, 0, 1, 0), Index4(2, 0, 0, 0), Index4(2, 0, 1, 0)}),
std::array<Index4, 4>({Index4(3, 0, 1, 0), Index4(0, 0, 1, 0), Index4(2, 0, 0, 0), Index4(1, 1, 0, 0)}),
std::array<Index4, 4>({Index4(1, 1, 0, 0), Index4(0, 0, 0, 0), Index4(2, 0, 0, 0), Index4(3, 0, 0, 0)}),
std::array<Index4, 4>({Index4(3, 0, 1, 0), Index4(1, 1, 0, 0), Index4(2, 0, 0, 0), Index4(3, 0, 0, 0)}),
std::array<Index4, 4>({Index4(1, 1, 1, 0), Index4(1, 1, 0, 0), Index4(0, 0, 1, 0), Index4(3, 0, 1, 0)}),
std::array<Index4, 4>({Index4(1, 1, 0, 0), Index4(3, 0, 0, 0), Index4(3, 0, 1, 0), Index4(2, 1, 0, 0)}),
std::array<Index4, 4>({Index4(3, 0, 1, 0), Index4(2, 1, 0, 0), Index4(2, 1, 1, 0), Index4(1, 1, 1, 0)}),
std::array<Index4, 4>({Index4(1, 1, 1, 0), Index4(1, 1, 0, 0), Index4(3, 0, 1, 0), Index4(2, 1, 0, 0)}),
std::array<Index4, 4>({Index4(1, 0, 0, 1), Index4(0, 0, 0, 1), Index4(0, 0, 1, 1), Index4(2, 0, 0, 0)}),
std::array<Index4, 4>({Index4(1, 0, 0, 1), Index4(0, 0, 1, 1), Index4(1, 0, 1, 1), Index4(2, 0, 0, 0)}),
std::array<Index4, 4>({Index4(0, 0, 0, 1), Index4(1, 1, 0, 1), Index4(0, 0, 1, 1), Index4(2, 0, 0, 0)}),
std::array<Index4, 4>({Index4(0, 0, 1, 1), Index4(1, 0, 1, 1), Index4(2, 0, 0, 0), Index4(2, 0, 1, 0)}),
std::array<Index4, 4>({Index4(3, 0, 1, 0), Index4(0, 0, 1, 1), Index4(2, 0, 0, 0), Index4(2, 0, 1, 0)}),
std::array<Index4, 4>({Index4(0, 0, 1, 1), Index4(3, 0, 0, 0), Index4(2, 0, 0, 0), Index4(1, 1, 0, 1)}),
std::array<Index4, 4>({Index4(0, 0, 0, 1), Index4(1, 1, 0, 1), Index4(2, 0, 0, 0), Index4(3, 0, 0, 0)}),
std::array<Index4, 4>({Index4(1, 1, 0, 1), Index4(3, 0, 1, 0), Index4(2, 0, 0, 0), Index4(3, 0, 0, 0)}),
std::array<Index4, 4>({Index4(1, 1, 0, 1), Index4(1, 1, 1, 1), Index4(0, 0, 1, 1), Index4(3, 0, 1, 0)}),
std::array<Index4, 4>({Index4(3, 0, 0, 0), Index4(1, 1, 0, 1), Index4(3, 0, 1, 0), Index4(2, 1, 0, 0)}),
std::array<Index4, 4>({Index4(2, 1, 0, 0), Index4(3, 0, 1, 0), Index4(2, 1, 1, 0), Index4(1, 1, 1, 1)}),
std::array<Index4, 4>({Index4(1, 1, 0, 1), Index4(1, 1, 1, 1), Index4(3, 0, 1, 0), Index4(2, 1, 0, 0)})
```

At each [i,j,k] index, one then loops through all of these tetrahedrons. While looping through each tetrahedron (e.g., in step 428 of FIG. 4), the values are compared to determine whether the value along any of the edges that create the tetrahedrons crosses the target iso-level (e.g., step 434), typically 0 (see FIG. 6). The iso-values at each of the vertices are then used to estimate the iso surface along each of the edges (i.e., step 436). The isosurface associated with each of these crossings is then constructed by connecting the edge crossings into a surface (i.e., step 438).

Due to the choice of tetrahedrons (3D simplex) the look-up conditions are simple and after omitting symmetries, there are only two distinct cases to evaluate that result in a surface crossing. 1-3 and 2-2 and none of them have indeterminate connectivity.

Testing

An algorithm provided in accordance with embodiments of the invention can still be evaluated in parallel with rectilinear sampling on two asymmetric grids with the appropriate offsets. In this regard, with hexagons, there is difficulty with parallelization. As such, by dividing a hexagon into two rectangular grids with asymmetric spacing, a simple framework may be established for indexing and moving between the grids. Embodiments of the invention provide such an indexing and spacing system.

Figure 9A:
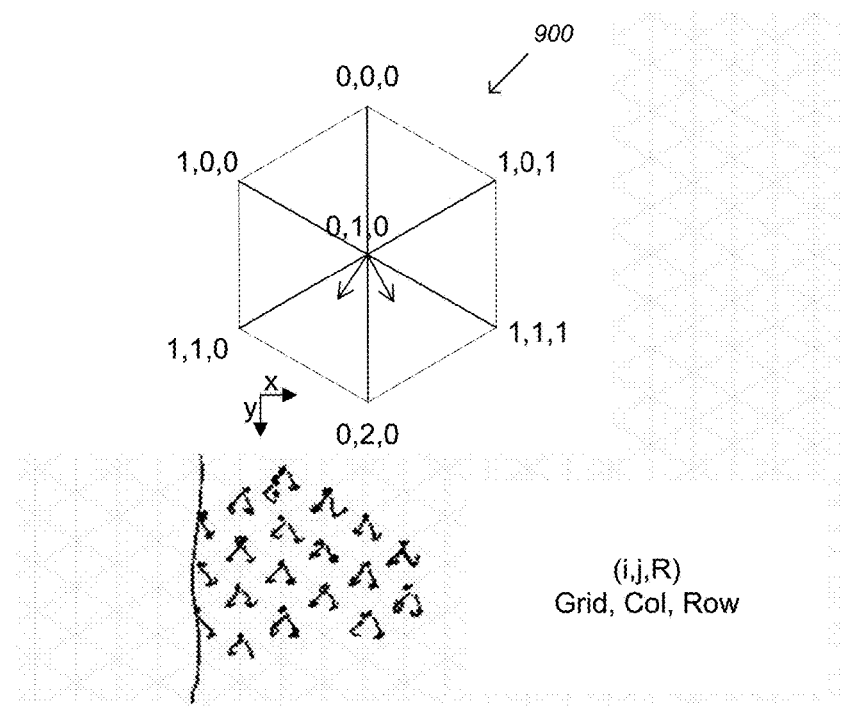
FIG. 9A illustrates indexing of a hexagonal sampling in accordance with one or more embodiments of the invention.
Figure 9B:
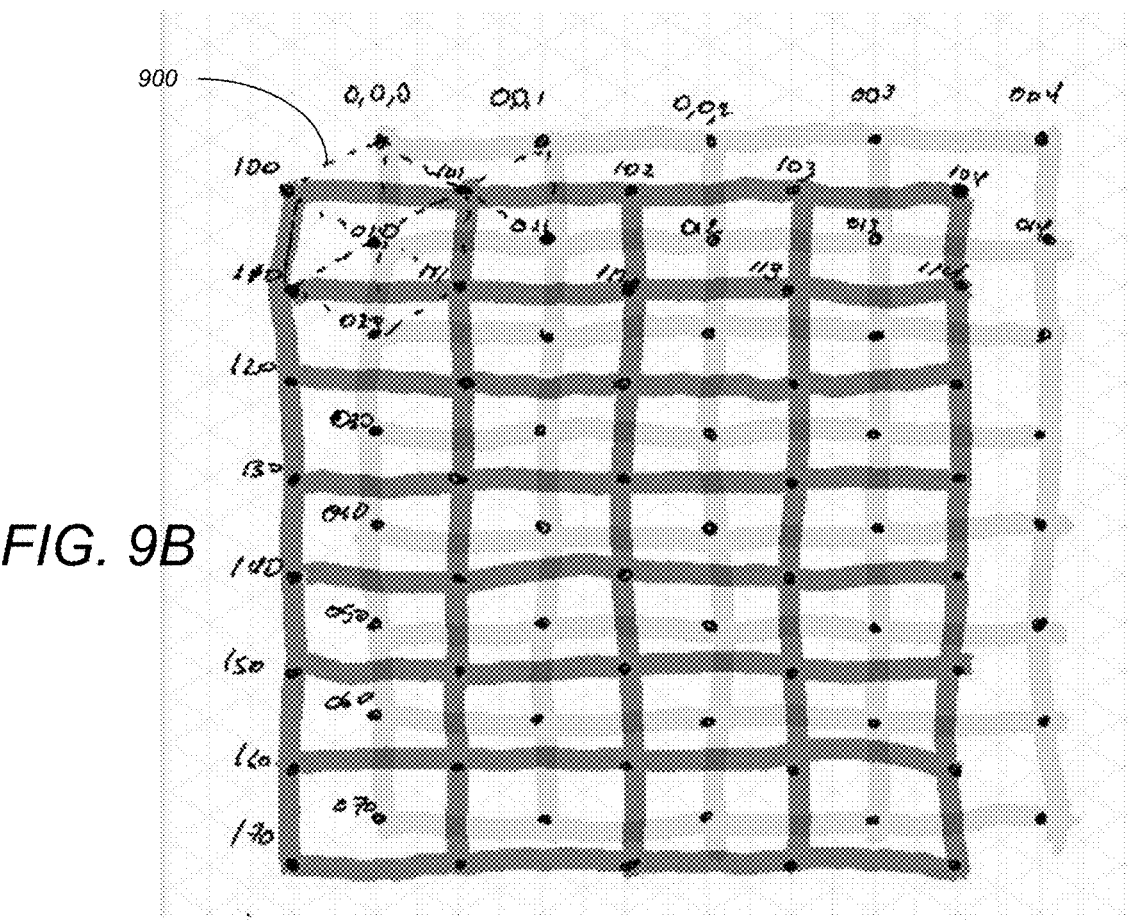
FIG. 9B illustrates the parallelization of two rectangular grids based on the hexagonal sampling of FIG. 9A in accordance with one or more embodiments of the invention.

More specifically, the indexing during contour generation may need to reference a new artificial dimension but still be easy to manage relative to potential sparse sampling schemes. Grids are formed with an x stride of $1\cdot\sqrt{3}$ and a y stride of 1. The true origin of the sampling grids is formed by an equilateral triangle pointing away from the sampling area through points (0,0,0) and (1,0,0). Each point is responsible for generating two triangles illustrated by the arrows in FIGS. 9A and 9B. In this regard, FIG. 9A illustrates indexing of a hexagonal sampling in accordance with one or more embodiments of the invention. FIG. 9B illustrates the parallelization of two rectangular grids based on the hexagonal sampling 900 of FIG. 9A in accordance with one or more embodiments of the invention. In may be noted that the three axis lengths are fixed, with x, y, and z representing different axis (i.e., the axis may be transformations of the original coordinate system).

Further to the above, it may be useful to describe what makes an extracted contour "good" so that the relevant metrics can be computed to compare performance. When evaluating the quality of an extracted contour, there are several metrics that can be used to measure its accuracy and precision. One such metric is the length of the contour, that reflects the overall fidelity of the extracted shape to the original object. In general, longer contours are considered to be better, as they capture more details and variations in the shape of the object.

However, the length of the contour alone may not be sufficient to evaluate its quality, as it may not capture the distribution of edge lengths within the contour. For example, a contour with many short edges may be less accurate than a contour with fewer but longer edges, even if they have the same total length. Therefore, one may also consider the distribution of edge lengths within the contour, as this can provide additional insights into its quality and accuracy. By analyzing the distribution of edge lengths, one can gain a more nuanced understanding of the contour's fidelity to the original object, and identify areas where the contour may be less accurate or more prone to errors. As such embodiments of the invention may utilize one or more of the following metrics:

Total contour length which is a measure of detected curve—Goal: Maximize this number because all curves detected are real and higher sampling will lead to more curvature which means increased length;

Distribution of edge lengths—Goal: Minimize abs (Mean-Median) to reduce skew, minimize standard deviation of edge length.

In view of the above, to evaluate the efficacy of this method relative to marching squares, embodiments of the invention may use the overall contour length (equivalent to surface area in 3D) as a proxy for how much of the contour is captured. In the specific case of an SDF, the average distance error of the surface is included, calculated through numerical integration. As for the fields to be sampled, embodiments utilized two examples, a simple gyro id with a uniform period of 1 mm, and a cylindrical SDF, with a radius of 2 mm. The domain evaluated was a square area 5 mm×5 mm.

2D Results and Discussion

Figure 10:
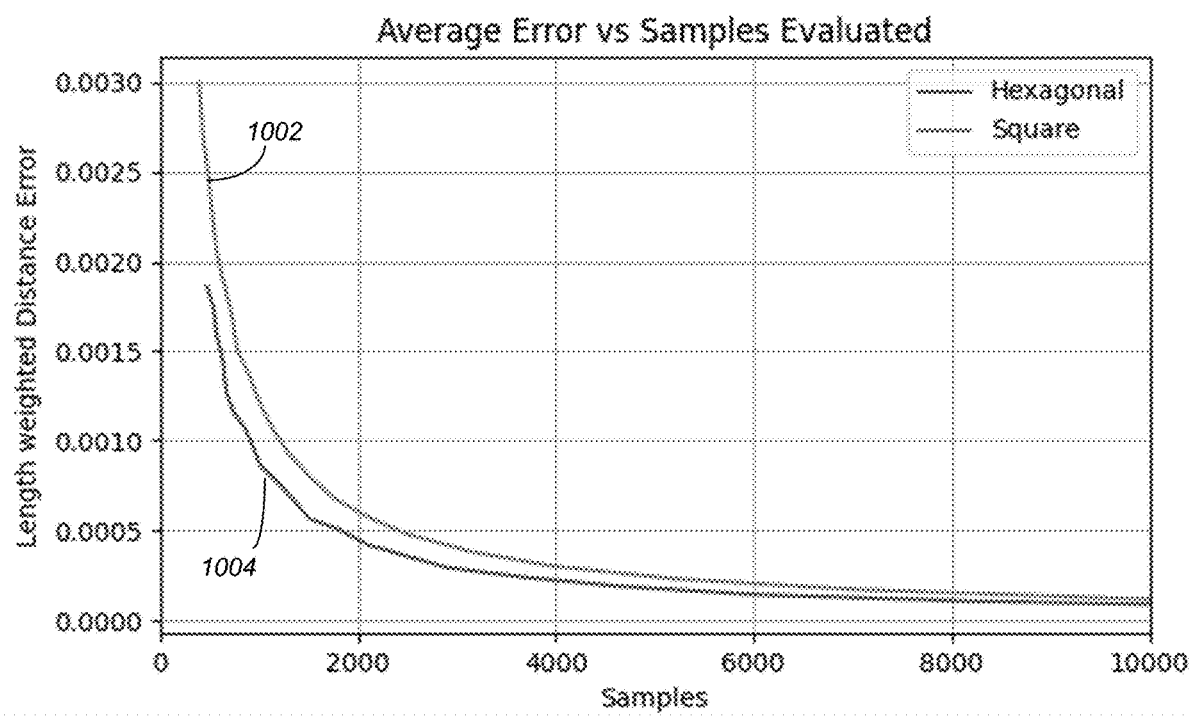
FIG. 10 illustrates an average distance error of 2D contours extracted from cylindrical SDF in accordance with one embodiment of the invention compared with prior art.
Figure 11:
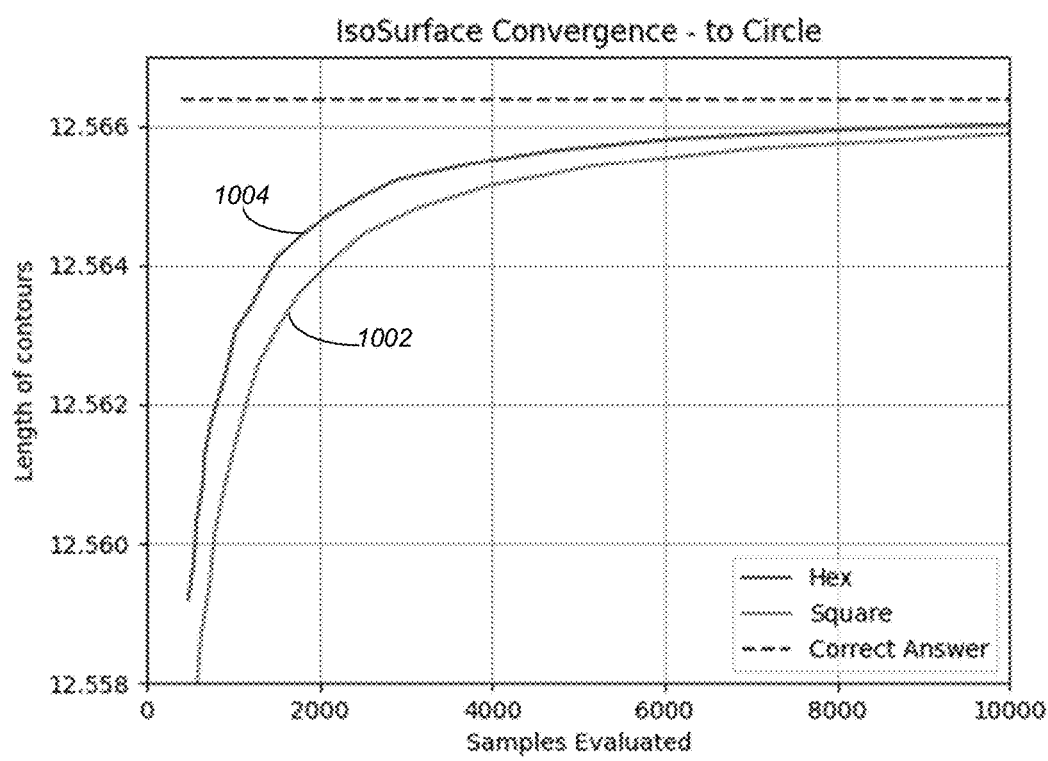
FIG. 11 illustrates the convergence of contours to a circle in accordance with one embodiment of the invention compared with that of prior art.

As FIGS. 10 and 11 show, for an equivalent number of sample points, the hexagonal sampling paired with marching triangles provides a higher fidelity curve that is closer to the ground truth, which is known due to the use of a SDF instead of an arbitrary field. In this regard, FIG. 10 illustrates the average distance error of 2D contours extracted from cylindrical SDF (in accordance with one embodiments of the invention compared with that of the prior art), and FIG. 11 illustrates the convergence of contours to circle (in accordance with one embodiments of the invention compared with that of the prior art).

The square curve 1002 and hexagonal curve 1004 are illustrated. Though the difference between the two curves 1002-1004 vertically is small, these functions are asymptotic and therefore the difference in samples to achieve the same level of resolution is of interest. For example, 6000 samples of a square lattice provide an equivalent resolution to ~4000 samples in a hexagonal lattice over the same domain. This represents a 33 percent improvement.

When viewed through the lens of a lattice and packing problem, higher density and more uniform sampling can lead to higher fidelity results. The "marching" part of the algorithm can be demonstrated with any number of configurations that are enumerated by $2^P$, where P is the number of points in the configuration, which can be reduced through symmetries.

This methodology of increasing the sampling density can also be applied to the 3D version of the marching problem to enable a Marching HCP/Tetrahedrons.

Figure 12:
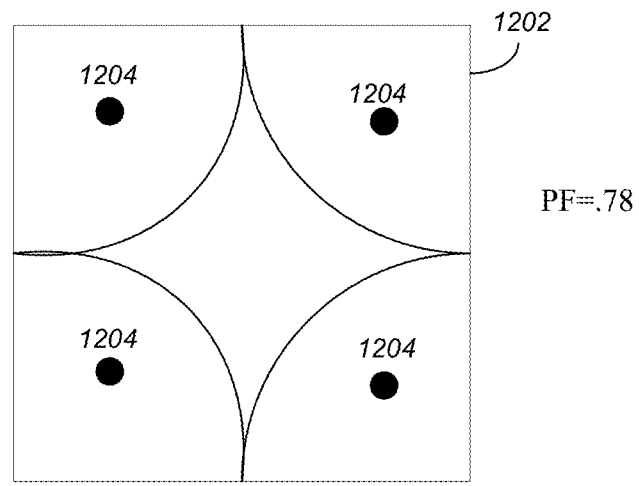
FIG. 12 illustrates a demonstration of the packing factor equivalence in accordance with one or more embodiments of the invention.
Figure 12:
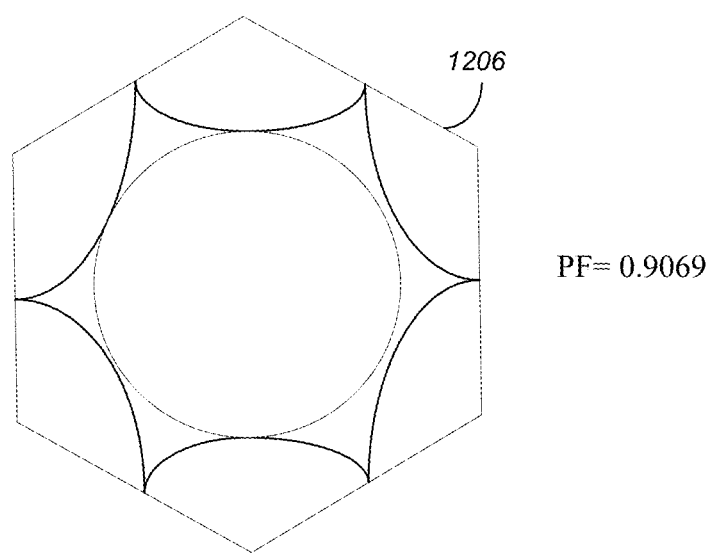

The math to extend the problem to marching cubes gets somewhat complicated. However, if one goes back to the original problem and examines it using standard lattice values, the "Packing Factor" of any given configuration can be used to quickly estimate sampling density as a function of edge length. FIG. 12 illustrates a demonstration of the packing factor equivalence in accordance with one or more embodiments of the invention. FIG. 12 further illustrates the calculation for the packing factor of the hex tiling and the square tiling in 2D. For the square tiling 1202 in 2D (where the samples are in the areas represented by dots 1204), the packing factor may be presented by the following equation:

$$PF = \frac{(\pi r^2)\left(\frac{1}{4}\right)(4)}{(2r)^2} = \frac{\pi}{4}$$

$$PF = .78$$

For the Hexagonal tiling 1206, the packing factor may be represented by:

$$PF = \frac{\left(\left(\frac{1}{3} \cdot 6\right) + 1\right)\pi r^2}{\frac{3\sqrt{3}}{2}(2r)^2} = \frac{\pi}{2\sqrt{3}}$$

$$PF = 0.9069$$

If one takes the ratio of samples in a given value and compares it to the ratio of the packing factors, one finds that they are equal. This gives the ability to quickly explore the application of various sampling configurations in higher dimensions with little work. Furthermore, the optimal solution in any dimension is the same as the optimal solution of the uniform sphere packing in that dimension.

Specifically, the samples over a domain, S, in a given dimension number, N, of a given lattice configuration with a Packing Factor, $PF_h$, and a given edge length, l, relative to a square configuration packing factor $PF_s$ and with edge length a can be calculated as follows:

$$SamplingRatio = (PF_1/PF_s)*(a/l)^N$$

The implication is that the samples changes as a factor of $(a/l)^N$ while the inscribed sphere changes linearly with edges length. In the 3D case, HCP (hexagonal closed packed structure) has a Packing Factor of 0.7405 and the Cubic Packing factor is 0.523. At equivalent edge lengths this would mean that 41.5 percent more sampling while the minimum inscribed sphere would be 69 percent smaller. However, for an equivalent inSphere, using the packing factors to calculate the sampling ratio, one arrives at 24 percent of the required sampling. Equal insphere might be a poor metric so a better comparison could be what is the insphere with equal sampling. For equal sampling between cubic and HCP in three (3) dimensions the edge length of HCP needs to be 12 percent longer. This results in the inSphere being 35 percent of the cubic sampling with equal number of samples.

3D Implementation

Figure 13:
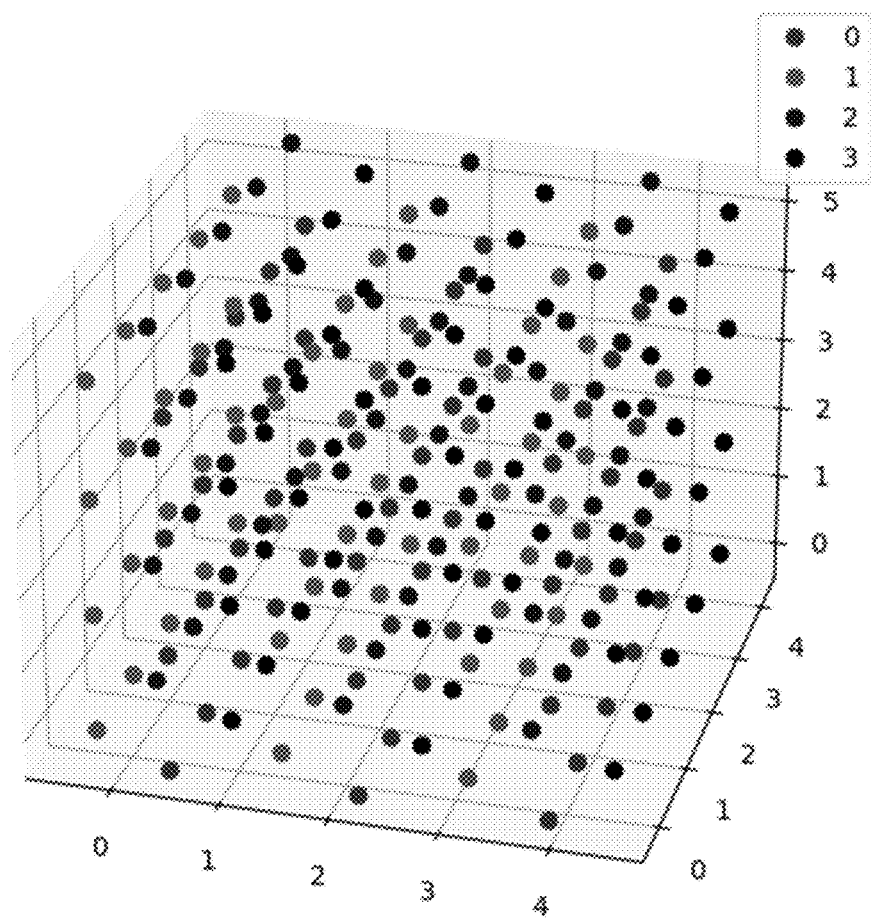
FIG. 13 illustrates a sampling pattern with points shaded by the grid to which they belong in accordance with one or more embodiments of the invention.

An HCP lattice configuration is well defined for the centroids of the nodes (sample points) but the connectivity of these in the context of forming tetrahedrons needs to be established. Furthermore, this connectivity should be such that it can be rendered simple for the purpose of parallel evaluation. Using a similar approach to that taken for the 2D hexahedral lattice, one can consider this HCP configuration to actually be four (4) asymmetric 3D sampling grids with an x stride of 1·√3, a y stride of 1 and a z stride length of 1·2·√2/3. Visually this pattern is shown in FIG. 13. In this regard, FIG. 13 illustrates a sampling pattern with points shaded by the grid to which they belong (i.e., grid 0, grid 1, grid 2, or grid 3).

Once there is a sampling grid that is easy to evaluate in parallel, it is necessary to create the appropriate connectivity that forms the most regular tests. This required the creation of a shape that can be tiled in 3D space and is composed of tetrahedrons. Here, the Ewald block is introduced, which is a 14 sided tetra decahedron. It can be perfectly tiled in 3D space, has a flat top and bottom which makes increments in the Z direction simple, and the tetrahedrons edge lengths range between 1 and 1·√2. It also has the nice property that within the sampling grid conceived earlier, all the indices for any given x, y, z index contain only references to that x, y, z index or those indices incremented by one. It is composed of twenty-four (24) tetrahedrons, twelve (12) of which are mirrored vertically about the center of HCP cell. The shape is shown in FIG. 5B (as described above). In this regard, FIG. 5B illustrates an irregular tetra decahedron that may be utilized in accordance with one or more embodiments of the invention.

Prior to looking at the results, it is worth considering the expected outcomes. Using the same analysis as described above, the analysis can be repeated for the 3D Unit cells:

TABLE 3

Comparison of 3D lattice Properties

| Lattice | Edge | Unit Volume | Max Sphere | Samples |
|---|---|---|---|---|
| Square | a | $a^3$ | $a \cdot \sqrt{3}$ | $(S_x \cdot S_y \cdot S_z)/a^3$ |
| Hex | 1 | $l^3 */6 \cdot \sqrt{2}$ | $1 \cdot (2 \cdot \sqrt{2}/(\sqrt{3} * 3)$ | $\sqrt{6} \cdot (S_x \cdot S_y \cdot S_z)/l^3$ |

If one assumes the same edge length and like terms are canceled, the following may result:

TABLE 4

Comparison of Lattice Properties Relative

| Lattice | Edge | Unit Volume | Max Sphere | Samples |
|---|---|---|---|---|
| Square | 1 | $1/(6 \cdot \sqrt{2})$ | $(2 \cdot \sqrt{2})/9$ | $\sqrt{2}$ |
| Hex | 1 | .118 | 0.314 | 1.42 |

This would indicate that an increase of 42 percent in sampling can reduce the diameter of a maximum inscribed sphere by 69 percent. One alternative could choose to increase the edge length until the maximum inscribed spheres were equal (or realistically any ratio), increasing the edge length by a factor of 3 and reduce the required sampling by greater than 85 percent!

3D Results and Discussion

3D Results

Figure 14:
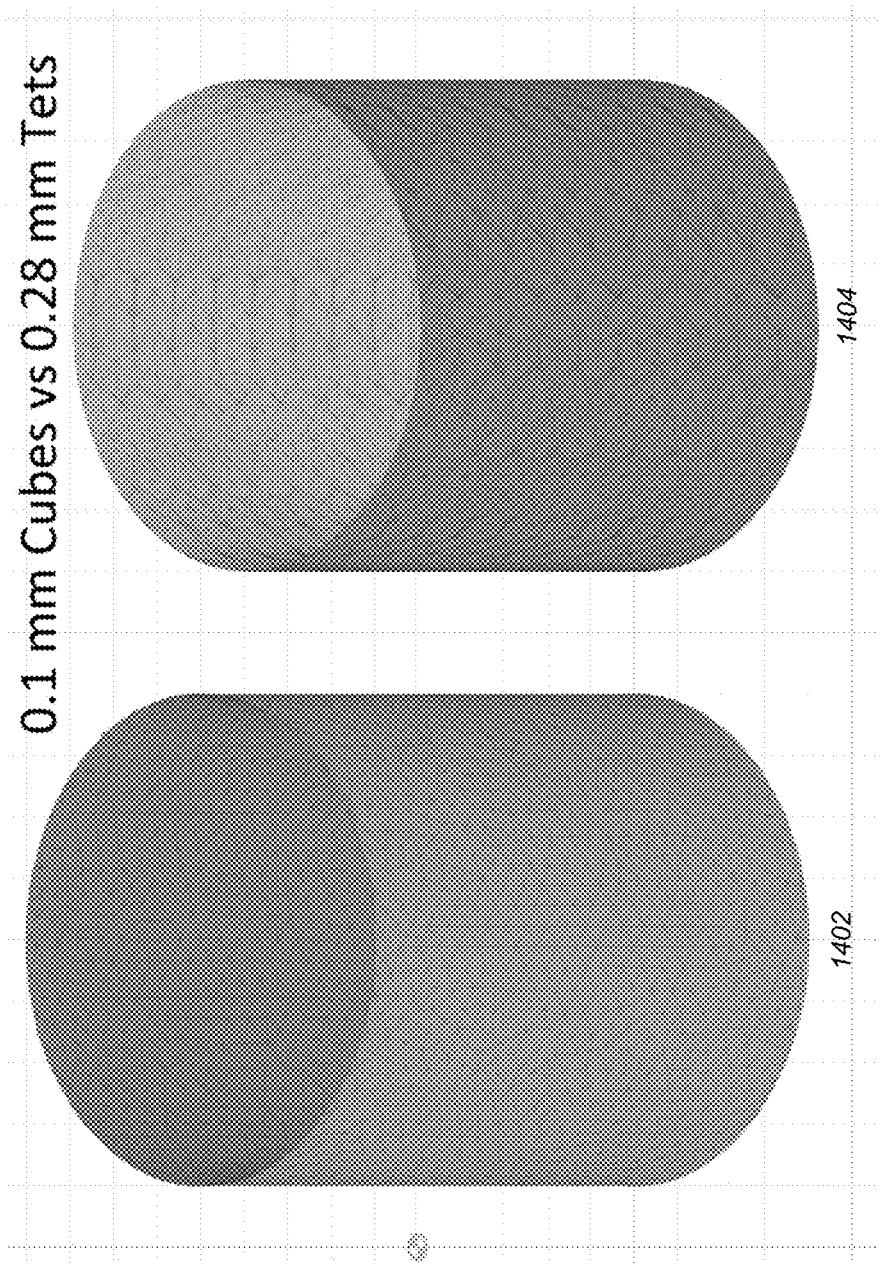
FIG. 14 illustrates an IsoSurfaces comparison for cylindrical SDF in accordance with one embodiment of the invention compared to prior art.

FIG. 14 illustrates an IsoSurfaces comparison for cylindrical SDF (in accordance with one embodiments of the invention compared with that of the prior art). The image shows a mesh generated from cubes (1402) with a node spacing of 0.1 mm. The image also shows a mesh generated from a new sampling pattern and tetrahedrons 1404 with a node spacing of 0.28 mm. The image shows similar results with an order of magnitude fewer samples. In this regard, a cylindrical SDF 1402-1404 was evaluated for a range of edge lengths using both the HCP Tets and the Marching Cubes algorithm. The results were evaluated based on the size of the triangles formed, and how closely the triangles conformed to the true cylindrical surface.

Figure 15:
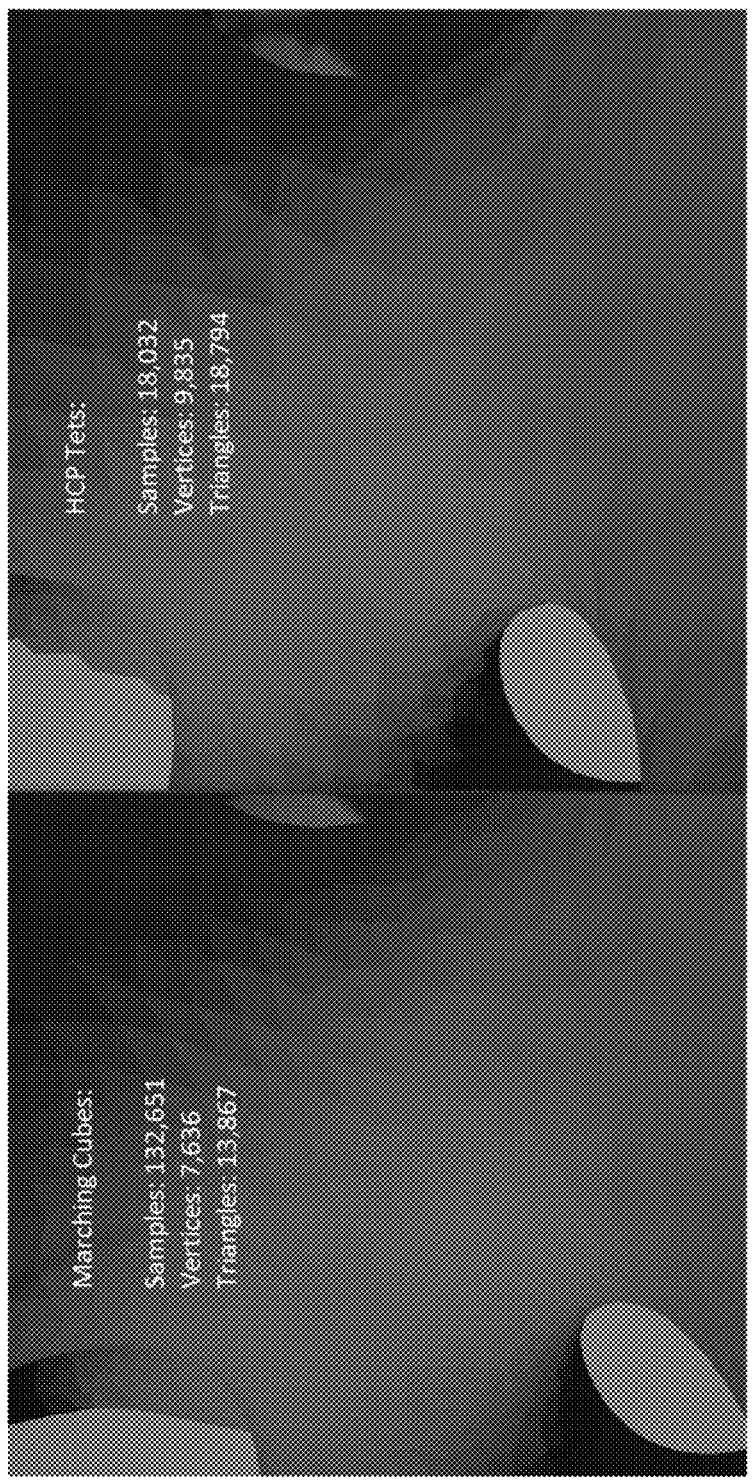
FIG. 15 illustrates an IsoSurfaces Gyroid Qualitative Comparison in accordance with one embodiment of the invention compared to the prior art.

Similarly, FIG. 15 illustrates an IsoSurfaces Gyroid Qualitative Comparison (in accordance with one embodiments of the invention compared with that of the prior art). As illustrated, the isosurfaces gyroid generated using marching cubes 1502 may be compared to that using HCP tetrahedrons 1504. In this regard, the surfaces generated from a 1 mm pitch gyroid 1504 over a 5 mm cubed domain 1502 were compared qualitatively. As illustrated, 132,651 samples were used for the marching cubes 1502 algorithm compared to the use of 18,032 samples for HCP tetrahedrons 1504. Such a reduction in the number of samples that need to be processed indicates a significant reduction in the computational cost.

Figure 16:
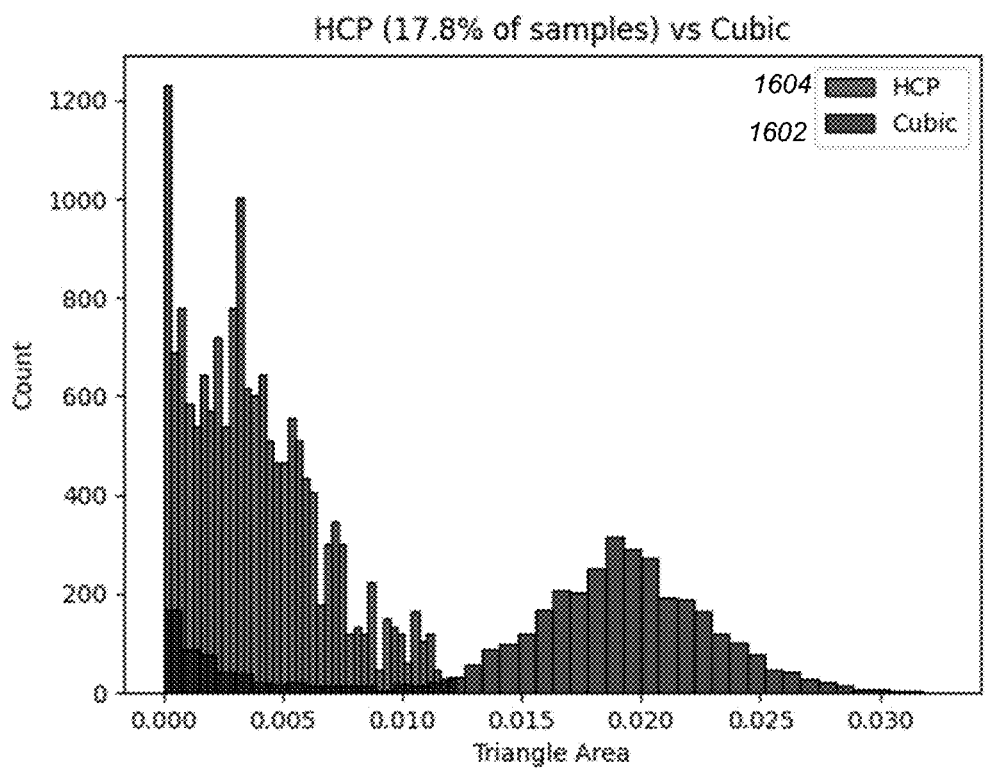
FIGS. 16 and 17 illustrate IsoSurfaces triangle sizes comparisons between cubic and HCP for a subset of samples in accordance with one embodiment of the invention compared to the prior art.
Figure 17:
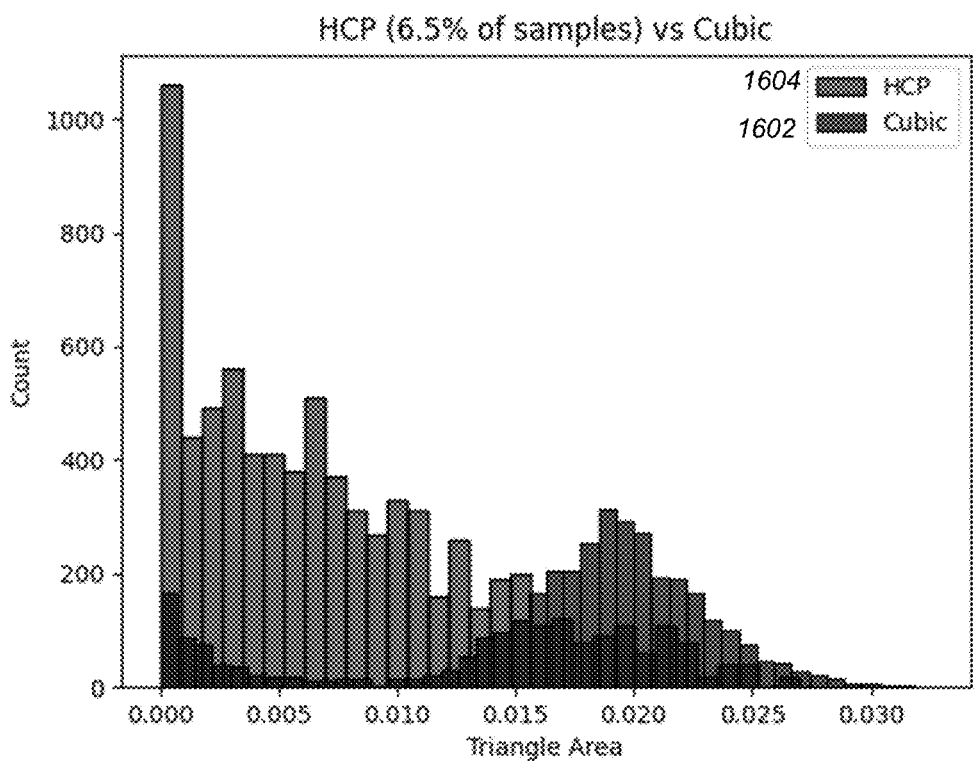

FIGS. 16 and 17 illustrate IsoSurfaces triangle sizes comparisons between cubic 1602 and HCP 1604 for a subset of samples in accordance with one embodiment of the invention compared to the prior art.

While all the results are field dependent FIGS. 15-17 show that you can reduce sampling anywhere from 5 to 20 fold and still achieve similar or better results.

Figure 18:
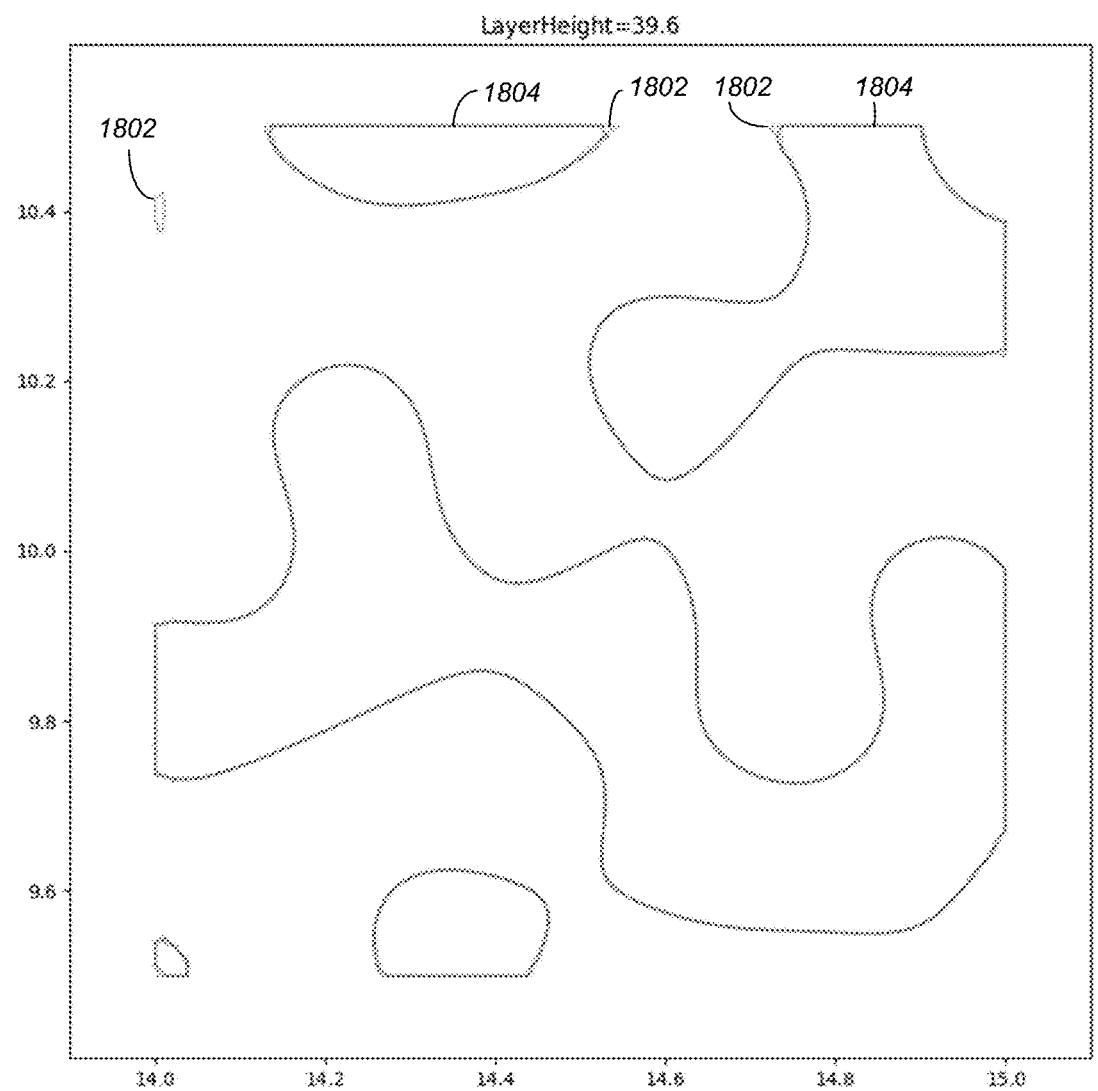
FIG. 18 illustrates a benchmark model used to demonstrate advantages of one embodiment of the invention compared to prior art.

Further to the above, FIG. 18 illustrates a benchmark model used to demonstrate advantages of one embodiment of the invention compared to prior art. The hexagon sampling pattern (2D version) is indicated by 1802 and the marching squares (2D version) is indicated by 1804. FIG. 18 illustrates the extra detail that is extracted from the hexagonal sampling pattern 1802 near the edges and corners of the contours. In FIG. 18, the hexagonal sampling edge length has been scaled up such that it uses 30% fewer samples than the marching squares pattern.

Hardware Embodiments

Figure 19:
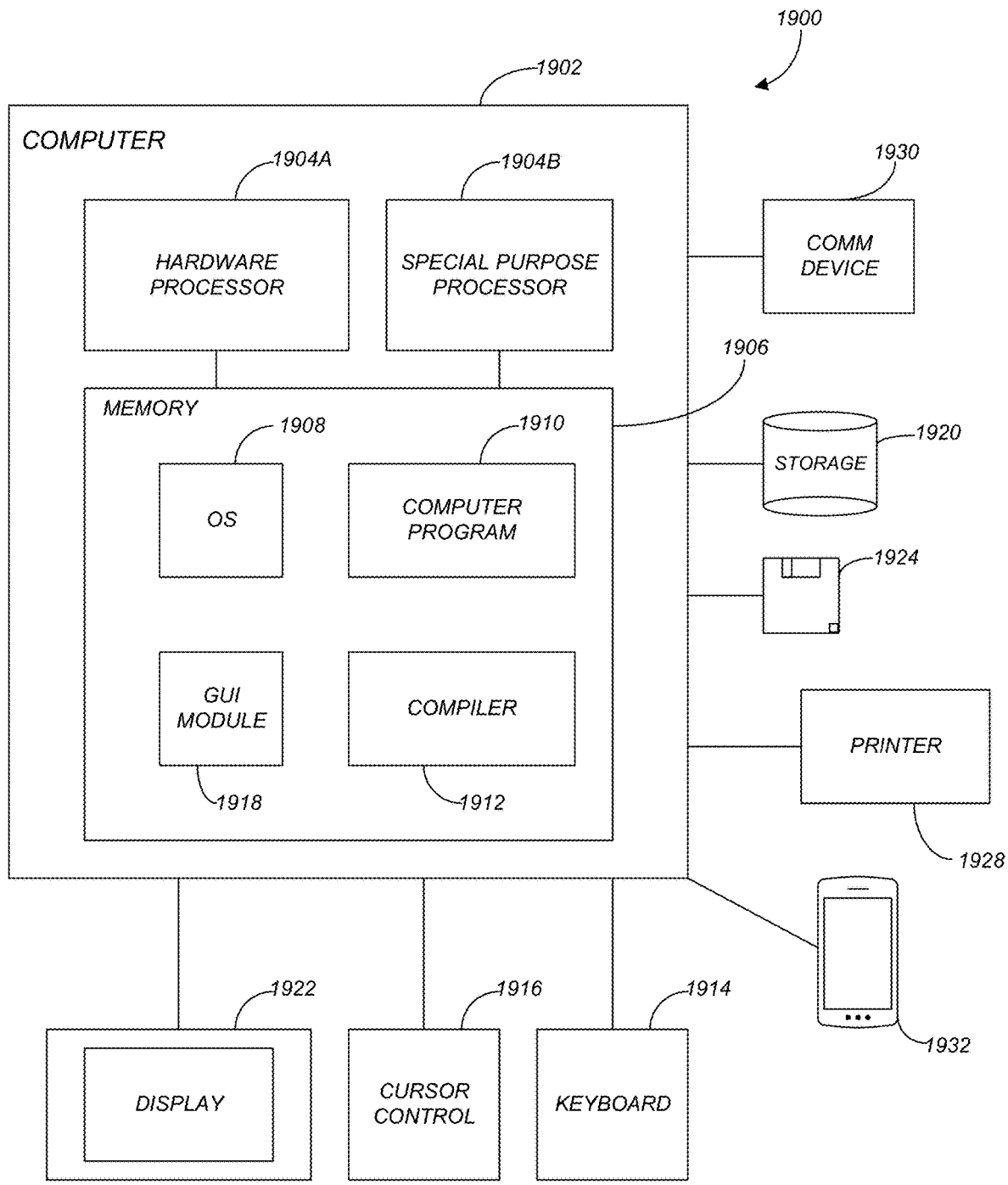
FIG. 19 is an exemplary hardware and software environment used to implement one or more embodiments of the invention.

FIG. 19 is an exemplary hardware and software environment 1900 (referred to as a computer-implemented system and/or computer-implemented method) used to implement one or more embodiments of the invention. The hardware and software environment includes a computer 1902 and may include peripherals. Computer 1902 may be a user/client computer, server computer, or may be a database computer. The computer 1902 comprises a hardware processor 1904A and/or a special purpose hardware processor 1904B (hereinafter alternatively collectively referred to as processor 1904) and a memory 1906, such as random access memory (RAM). The computer 1902 may be coupled to, and/or integrated with, other devices, including input/output (I/O) devices such as a keyboard 1914, a cursor control device 1916 (e.g., a mouse, a pointing device, pen and tablet, touch screen, multi-touch device, etc.) and a printer 1928. In one or more embodiments, computer 1902 may be coupled to, or may comprise, a portable or media viewing/listening device 1932 (e.g., an MP3 player, IPOD, NOOK, portable digital video player, cellular device, personal digital assistant, etc.). In yet another embodiment, the computer 1902 may comprise a multi-touch device, mobile phone, gaming system, internet enabled television, television set top box, or other internet enabled device executing on various platforms and operating systems.

In one embodiment, the computer 1902 operates by the hardware processor 1904A performing instructions defined by the computer program 1910 (e.g., a computer-aided design [CAD] application) under control of an operating system 1908. The computer program 1910 and/or the operating system 1908 may be stored in the memory 1906 and may interface with the user and/or other devices to accept input and commands and, based on such input and commands and the instructions defined by the computer program 1910 and operating system 1908, to provide output and results.

Output/results may be presented on the display 1922 or provided to another device for presentation or further processing or action. In one embodiment, the display 1922 comprises a liquid crystal display (LCD) having a plurality of separately addressable liquid crystals. Alternatively, the display 1922 may comprise a light emitting diode (LED) display having clusters of red, green and blue diodes driven together to form full-color pixels. Each liquid crystal or pixel of the display 1922 changes to an opaque or translucent state to form a part of the image on the display in response to the data or information generated by the processor 1904 from the application of the instructions of the computer program 1910 and/or operating system 1908 to the input and commands. The image may be provided through a graphical user interface (GUI) module 1918. Although the GUI module 1918 is depicted as a separate module, the instructions performing the GUI functions can be resident or distributed in the operating system 1908, the computer program 1910, or implemented with special purpose memory and processors.

In one or more embodiments, the display 1922 is integrated with/into the computer 1902 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD, SURFACE Devices, etc.), portable/handheld game/music/video player/console devices (e.g., IPOD TOUCH, MP3 players, NINTENDO SWITCH, PLAYSTATION PORTABLE, etc.), touch tables, and walls (e.g., where an image is projected through acrylic and/or glass, and the image is then backlit with LEDs).

Some or all of the operations performed by the computer 1902 according to the computer program 1910 instructions may be implemented in a special purpose processor 1904B. In this embodiment, some or all of the computer program 1910 instructions may be implemented via firmware instructions stored in a read only memory (ROM), a programmable read only memory (PROM) or flash memory within the special purpose processor 1904B or in memory 1906. The special purpose processor 1904B may also be hardwired through circuit design to perform some or all of the operations to implement the present invention. Further, the special purpose processor 1904B may be a hybrid processor, which includes dedicated circuitry for performing a subset of functions, and other circuits for performing more general functions such as responding to computer program 1910 instructions. In one embodiment, the special purpose processor 1904B is an application specific integrated circuit (ASIC).

The computer 1902 may also implement a compiler 1912 that allows an application or computer program 1910 written in a programming language such as C, C++, Assembly, SQL, PYTHON, PROLOG, MATLAB, RUBY, RAILS, HASKELL, or other language to be translated into processor 1904 readable code. Alternatively, the compiler 1912 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 1910 accesses and manipulates data accepted from I/O devices and stored in the memory 1906 of the computer 1902 using the relationships and logic that were generated using the compiler 1912.

The computer 1902 also optionally comprises an external communication device such as a modem, satellite link, Ethernet card, or other device for accepting input from, and providing output to, other computers 1902.

In one embodiment, instructions implementing the operating system 1908, the computer program 1910, and the compiler 1912 are tangibly embodied in a non-transitory computer-readable medium, e.g., data storage device 1920, which could include one or more fixed or removable data storage devices, such as a zip drive, floppy disc drive 1924, hard drive, CD-ROM drive, tape drive, etc. Further, the operating system 1908 and the computer program 1910 are comprised of computer program 1910 instructions which, when accessed, read and executed by the computer 1902, cause the computer 1902 to perform the steps necessary to implement and/or use the present invention or to load the program of instructions into a memory 1906, thus creating a special purpose data structure causing the computer 1902 to operate as a specially programmed computer executing the method steps described herein. Computer program 1910 and/or operating instructions may also be tangibly embodied in memory 1906 and/or data communications devices 1930, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 1902.

Figure 20:
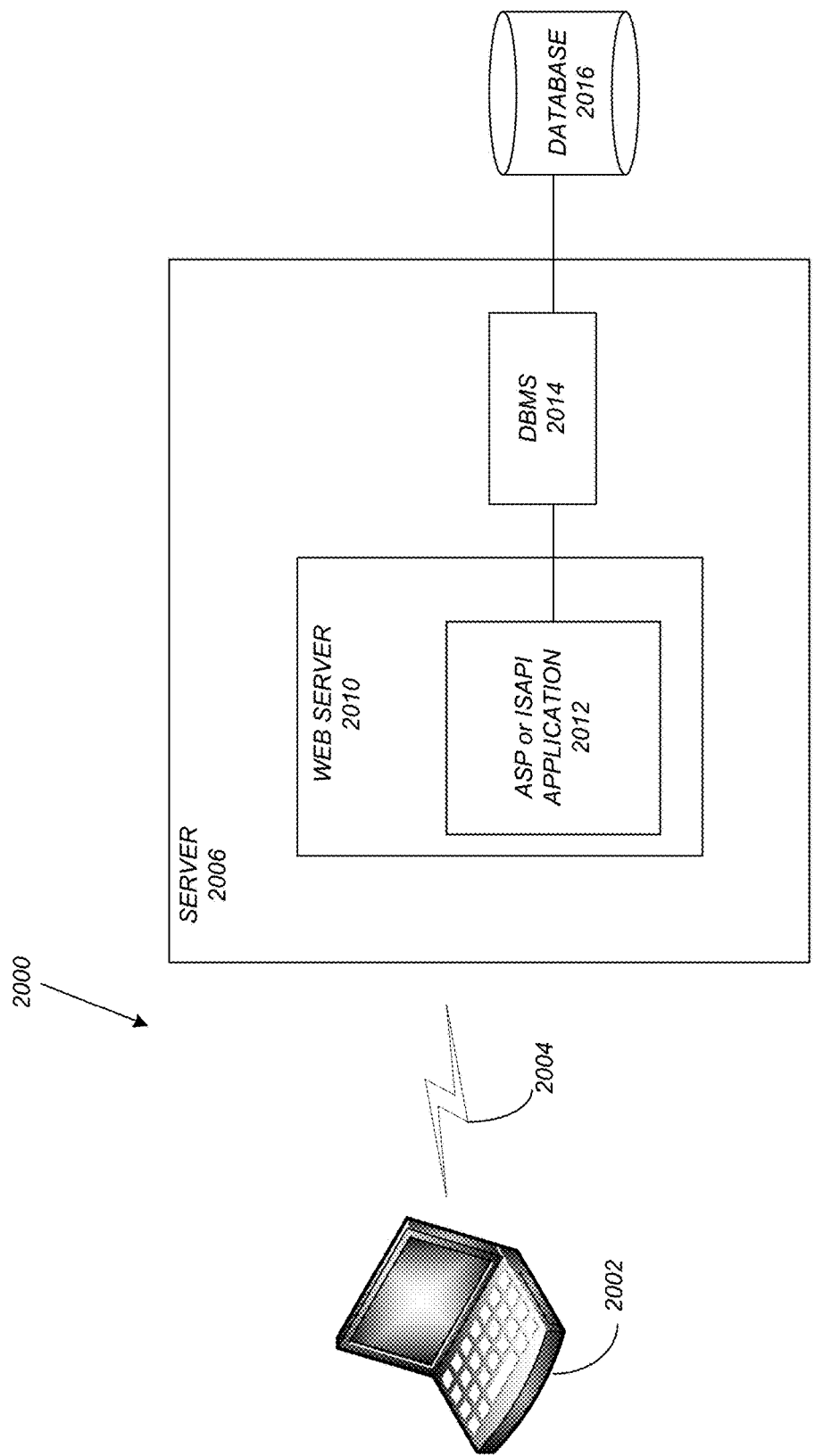
FIG. 20 schematically illustrates a typical distributed/cloud-based computer utilized in accordance with one or more embodiments of the invention.

FIG. 20 schematically illustrates a typical distributed/cloud-based computer system 2000 using a network 2004 to connect client computers 2002 to server computers 2006. A typical combination of resources may include a network 2004 comprising the Internet, LANs (local area networks), WANs (wide area networks), SNA (systems network architecture) networks, or the like, clients 2002 that are personal computers or workstations (as set forth in FIG. 19), and servers 2006 that are personal computers, workstations, minicomputers, or mainframes (as set forth in FIG. 19). However, it may be noted that different networks such as a cellular network (e.g., GSM [global system for mobile communications] or otherwise), a satellite based network, or any other type of network may be used to connect clients 2002 and servers 2006 in accordance with embodiments of the invention.

A network 2004 such as the Internet connects clients 2002 to server computers 2006. Network 2004 may utilize ethernet, coaxial cable, wireless communications, radio frequency (RF), etc. to connect and provide the communication between clients 2002 and servers 2006. Further, in a cloud-based computing system, resources (e.g., storage, processors, applications, memory, infrastructure, etc.) in clients 2002 and server computers 2006 may be shared by clients 2002, server computers 2006, and users across one or more networks. Resources may be shared by multiple users and can be dynamically reallocated per demand. In this regard, cloud computing may be referred to as a model for enabling access to a shared pool of configurable computing resources.

Clients 2002 may execute a client application or web browser and communicate with server computers 2006 executing web servers 2010. Such a web browser is typically a program such as MICROSOFT INTERNET EXPLORER/EDGE, MOZILLA FIREFOX, OPERA, APPLE SAFARI, GOOGLE CHROME, etc. Further, the software executing on clients 2002 may be downloaded from server computer 2006 to client computers 2002 and installed as a plug-in or ACTIVEX control of a web browser. Accordingly, clients 2002 may utilize ACTIVEX components/component object model (COM) or distributed COM (DCOM) components to provide a user interface on a display of client 2002. The web server 2010 is typically a program such as MICROSOFT'S INTERNET INFORMATION SERVER.

Web server 2010 may host an Active Server Page (ASP) or Internet Server Application Programming Interface (ISAPI) application 2012, which may be executing scripts. The scripts invoke objects that execute business logic (referred to as business objects). The business objects then manipulate data in database 2016 through a database management system (DBMS) 2014. Alternatively, database 2016 may be part of, or connected directly to, client 2002 instead of communicating/obtaining the information from database 2016 across network 2004. When a developer encapsulates the business functionality into objects, the system may be referred to as a component object model (COM) system. Accordingly, the scripts executing on web server 2010 (and/or application 2012) invoke COM objects that implement the business logic. Further, server 2006 may utilize MICROSOFT'S TRANSACTION SERVER (MTS) to access required data stored in database 2016 via an interface such as ADO (Active Data Objects), OLE DB (Object Linking and Embedding DataBase), or ODBC (Open DataBase Connectivity).

Generally, these components 2000-2016 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 2002 and 2006 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 2002 and 2006. Embodiments of the invention are implemented as a software/CAD application on a client 2002 or server computer 2006. Further, as described above, the client 2002 or server computer 2006 may comprise a thin client device or a portable device that has a multi-touch-based display.

CONCLUSION

This concludes the description of the preferred embodiment of the invention. Approaches (of embodiments of the invention) to space sampling are applicable for any voxel sampling methods for example, medical imaging, video game graphics, and voxel based packing algorithms. In this realm the reduced sampling plays a critical role because each instance of each placed part needs to examine each sample. This means the processing may be reduced by a multiple of up to 100.

Embodiments of the invention can be paired with existing strategies such as adaptive sampling. Sparse volume sampling and topology preserving spatial distortions can also be applied in order to improve sampling efficiency.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for extracting an isosurface, comprising:
    (a) creating a set of three-dimensional (3D) asymmetric sampling grids based on a sampling resolution and a region of interest, wherein:
        (i) the set of 3D asymmetric sampling grids cover a 3D scalar field; and
        (ii) the 3D asymmetric sampling grids comprise one or more tiles, wherein each of the one or more tiles comprises one or more tetrahedrons;
    (b) evaluating the 3D scalar field based on the set of 3D asymmetric sampling grids, wherein:
        (i) the evaluating generates a value for each of the one or more tiles; and
        (ii) the evaluating converts the values to cells;
        (iii) the evaluating assigns an index to each cell;
    (c) for each cell, utilizing the cell's index to identify, in a lookup table, an enumerated tetrahedron;
    (d) for each identified enumerated tetrahedron that contains an isosurface crossing, estimating an isosurface connection between new points of an edge of the identified enumerated tetrahedron;
    (e) creating a mesh to connect the new points; and
    (f) utilizing the mesh as the extracted isosurface.

2. The computer-implemented method of claim 1, wherein:
    the set of 3D asymmetric sampling grids comprises four (4) sampled field data grids; and
    the four sampled field data grids are merged while preserving the indices.

3. The computer-implemented method of claim 1, wherein:
    all vertices that form the one or more tiles are bounded within the set of 3D asymmetric sampling grids and the indices; and
    the cells are positively indexed.

4. The computer-implemented method of claim 1, wherein:
    the lookup table comprises twenty-four (24) enumerated tetrahedrons; and
    the identifying of the enumerated tetrahedron is done in parallel for each enumerated tetrahedron in the lookup table.

5. The computer-implemented method of claim 1, wherein:
    the identifying of the enumerated tetrahedron and estimating are iteratively performed over three or more dimensions.

6. The computer-implemented method of claim 1, wherein:
    the one or more tiles comprise hexagonal close pack (HCP) tetrahedrons.

7. The computer-implemented method of claim 6, wherein:
    the index is based on four (4) dimensions; and
    a stride between sampled points in the one or more tiles varies by dimension.

8. The computer-implemented method of claim 1, further comprising constructing a solid out of the set of 3D asymmetric sampling grids, wherein the solid:
    is space filing or tileable;
    is non-self intersecting; and
    has a consistent winding direction.

9. The computer-implemented method of claim 8, wherein the solid uses all vertices of the scalar field.

10. The computer-implemented method of claim 1, wherein each index is connected out of two or more simplex shapes.

11. A computer-implemented system for extracting an isosurface, comprising:
    (a) a computer having a memory;
    (b) a processor executing on the computer;
    (c) the memory storing a set of instructions, wherein the set of instructions, when executed by the processor cause the processor to perform operations comprising:
        (i) creating a set of three-dimensional (3D) asymmetric sampling grids based on a sampling resolution and a region of interest, wherein:
            (A) the set of 3D asymmetric sampling grids cover a 3D scalar field; and
            (B) the 3D asymmetric sampling grids comprise one or more tiles, wherein each of the one or more tiles comprises one or more tetrahedrons;
        (ii) evaluating the 3D scalar field based on the set of 3D asymmetric sampling grids, wherein:
            (A) the evaluating generates a value for each of the one or more tiles; and (B) the evaluating converts the values to cells;
(C) the evaluating assigns an index to each cell;
(iii) for each cell, utilizing the cell's index to identify, in a lookup table, an enumerated tetrahedron;
(iv) for each identified enumerated tetrahedron that contains an isosurface crossing, estimating an isosurface connection between new points of an edge of the identified enumerated tetrahedron;
(v) creating a mesh to connect the new points; and
(vi) utilizing the mesh as the extracted isosurface.

12. The computer-implemented system of claim 11, wherein:
the set of 3D asymmetric sampling grids comprises four (4) sampled field data grids; and
the four sampled field data grids are merged while preserving the indices.

13. The computer-implemented system of claim 11, wherein:
all vertices that form the one or more tiles are bounded within the set of 3D asymmetric sampling grids and the indices; and
the cells are positively indexed.

14. The computer-implemented system of claim 11, wherein:
the lookup table comprises twenty-four (24) enumerated tetrahedrons; and
the identifying of the enumerated tetrahedron is done in parallel for each enumerated tetrahedron in the lookup table.

15. The computer-implemented system of claim 11, wherein:
the identifying of the enumerated tetrahedron and estimating are iteratively performed over three or more dimensions.

16. The computer-implemented system of claim 11, wherein:
the one or more tiles comprise hexagonal close pack (HCP) tetrahedrons.

17. The computer-implemented system of claim 16, wherein:
the index is based on four (4) dimensions; and
a stride between sampled points in the one or more tiles varies by dimension.

18. The computer-implemented system of claim 11, wherein the operations further comprise constructing a solid out of the set of 3D asymmetric sampling grids, wherein the solid:
is space filing or tileable;
is non-self intersecting; and
has a consistent winding direction.

19. The computer-implemented system of claim 18, wherein the solid uses all vertices of the scalar field.

20. The computer-implemented system of claim 11, wherein each index is connected out of two or more simplex shapes.

* * * * *